United States Patent [19]
Kusunoki et al.

[11] Patent Number: 5,789,094
[45] Date of Patent: Aug. 4, 1998

[54] FUEL CELL AND SEALING PARTS THEREFORE

[75] Inventors: Akira Kusunoki; Jitsuji Otsuki; Yasuhira Kikuoka, all of Osaka; Tatsunori Okada, Hyogo; Mitsuie Matsumura, Hyogo; Toshio Shinoki, Hyogo; Masahiro Mukai, Hyogo; Tetsuya Yagi, Hyogo, all of Japan

[73] Assignees: Kansai Electric Power Co., Inc., Osaka; Mitsubishi Denki Kabushiki Kaisha, Tokyo, both of Japan

[21] Appl. No.: 762,394

[22] Filed: Dec. 9, 1996

Related U.S. Application Data

[62] Division of Ser. No. 379,319, Jan. 25, 1995, Pat. No. 5,616,431.

[30] Foreign Application Priority Data

Jan. 27, 1994 [JP] Japan ................... 6-007516

[51] Int. Cl.⁶ ................... H01M 2/08
[52] U.S. Cl. ................... 429/39; 429/35; 429/38
[58] Field of Search ................... 429/35, 38, 39

[56] References Cited

U.S. PATENT DOCUMENTS

| | | | |
|---|---|---|---|
| 3,575,719 | 4/1971 | Nelson et al. | 429/35 X |
| 4,943,495 | 7/1990 | Kaisha . | |
| 4,978,591 | 12/1990 | Wright | 429/35 |
| 5,096,786 | 3/1992 | Granata, Jr. et al. | 429/35 |

FOREIGN PATENT DOCUMENTS

| | | |
|---|---|---|
| 5-190187 | 7/1993 | Japan . |
| WO92/02057 | 2/1992 | WIPO . |

*Primary Examiner*—John S. Maples
*Attorney, Agent, or Firm*—Wolf, Greenfield & Sacks, P.C.

[57] ABSTRACT

A bipolar plate is designed to provide a gas seal 16 around an electrode and gas seals 17a around fuel gas manifolds on the same plane and to separate the gas seal 16 and gas seals 17a around oxidant gas manifolds 4, 6 with hollowed parts on an anode electrode 25 side, and to provide the gas seal 16 and the gas seals 17b on a same plane and to separate the gas seal 16 and the gas seals 17a with hollowed parts on a cathode electrode 20 side. Also disclosed are sealing parts for the fuel side and the oxidant side of the fuel cell.

3 Claims, 11 Drawing Sheets

FUEL CELL AND SEALING PARTS THEREFORE

This application is a division of application Ser. No. 08/379,319, filed Jan. 25, 1995, entitled FUEL CELL AND ITS BIPOLAR PLATE, U.S. Pat. No. 5,616,431.

BACKGROUND OF THE INVENTION

1. Field of the Invention

This invention relates to a fuel cell, and more particularly, mainly concerns the construction of a bipolar plate, a manufacturing method of the bipolar plate and the like.

2. Description of the Prior Art

FIG. 1 is a perspective view showing a conventional fuel cell bipolar plate, which is illustrated in the Japanese Unexamined Patent Application Published under No. 208559/87 (Sho. 62) and referred to as a separator plate in that publication, in the state of being separated by each plate member on its upper side. In that figure, reference numeral 1 designates a bipolar plate substrate which separates fuel gas and oxidant gas in the laminated direction. Reference numeral 2a designates a first hard frame in a sealing part, which is referred to as a distance piece in the above publication, for forming a gas seal between layers and fuel supplying or exhausting manifolds; numeral 2b designates a second hard frame, which is referred to as a mask in the above publication, for forming a gas seal between layers similarly; numeral 3 designates a corrugated plate for maintaining fuel channels to be formed in the hollowed part 8 at the inside part of the hard frame 2a; numerals 4 designate oxidant gas supplying manifolds; numerals 5 designate fuel gas supplying manifolds; numerals 6 designate oxidant gas exhausting manifolds; numerals 7 designate fuel gas exhausting manifolds; and numeral 9 designates a hollowed part at the inside part of the hard frame 2b, in which hollowed part 9 an electrode (not shown) is to be inserted. On the hard frame 2b an electrolyte matrix, which has the same shape as that of the bipolar plate substrate 1, is furthermore laminated, and then a hard frame 2b, a corrugated plate 3, a hard frame 2a and a bipolar plate substrate 1 are respectively laminated on the electrolyte matrix in this order so as to be symmetric to the lower part with respect to the electrolyte matrix. In the upper hard frame 2a corresponding to the lower hard frame 2a, the oxidant gas supplying manifolds 4 and the oxidant gas exhausting manifolds 6 are respectively opened to the hollowed part 8, and conversely the fuel gas supplying manifolds 5 and the fuel gas exhausting manifolds 7 are isolated. The required number of cells are laminated by repeating the above described lamination, and appropriate surface pressure is impressed on the top and bottom surfaces of each layer having been laminated.

FIG. 2 shows an enlarged view of a cross section A—A, illustrated in FIG. 1, of the laminated fuel cell, which place is a gas sealing around electrode planes. In the figure, reference numeral 20 designates an oxidant gas side electrode; numeral 22 designates a corrugated plate for oxidant gas; numeral 24 designates an oxidant gas side current collector; numeral 25 designates an anode electrode; numeral 26 designates a fuel gas side current collector; and numeral 30 designates an electrolyte matrix.

Next, its operation will be described. Fuel gas is supplied into the hollowed part 8 through the fuel gas supplying manifolds 5 which penetrate through the bipolar plate substrate 1, the hard frame 2a and the hard frame 2b vertically, and the fuel gas passes through the corrugated plate 3, performing cell reactions, to be lead to the fuel gas exhausting manifolds 7. On the other hand, the oxidant gas passes through the channels on the opposite side of the cell from the oxidant gas supplying manifolds 4, which similarly penetrate the substrate 1 and the hard frames 2a, 2b vertically, through the electrolyte matrix 30 to be lead to the oxidant gas exhausting manifolds 6, contributing to cell reactions.

In the construction of the conventional fuel cell bipolar plate, since the gas sealing parts around the electrode planes and the gas sealing parts of the manifolds adjoin on the same plane, electrolyte matrices which are filled up with electrolyte are used as the gaskets of the gas sealing parts of the manifolds similarly to the cell reacting area, too. That is to say, in the above conventional construction, an electrolyte matrix which has the same size as the external shape of the hard frame 2b is used as the electrolyte matrix 30, and the electrolyte matrix 30 has a performance of the gasket materials in the sealing parts around the manifolds, also. The electrolyte matrix 30 holds electrolyte in the vacant spaces of a porous electrolyte-holding material, and has the gas sealing function. The electrolyte matrix 30 is directly held on both of its surfaces between the hard frames 2b made of metal material at the gas sealing parts around the manifolds, and it has no electrolyte supplying source in the close vicinity. Accordingly, electrolyte permeates through the electrolyte matrix 30 from its cell reacting area to be supplied to its manifold parts.

In the prior art bipolar plate shown in FIG. 2, the hard frames 2a and 2b form gas seals around electrode planes together with the electrolyte matrix 30, and the height of its gas sealing part and the height of its cell reacting area, both of which are expressed by the next formulae (1) and (2) respectively, are designed so as to be substantially the same, and thereby the occurrences of cracks on the boundary line between gas sealing area and reacting area of the electrolyte matrix 30 are prevented.

(the height of the gas sealing part)=(the thickness of the hard frame 2a)+(the thickness of the hard frame 2b)    (1)

(the height of the cell reacting area part)=(the thickness of the corrugated plate)+(the thickness of the current collector)+(the thickness of the electrode)    (2)

Since the conventional fuel cell bipolar plate has the above construction and operates as mentioned above, there is the possibility of occurrence of the leakage of gas caused by the appearance of vacant spaces between layers in some combination of the thickness accuracy, the surface roughness, the distortions and the like of the bipolar plate substrate 1, the hard frame 2a and the hard frame 2b. Furthermore, since the sealing parts are constructed of the hard frames, the surface pressure which is impressed on the top and the bottom surfaces of each layer of the bipolar plate may produce the difference in magnitude between the sealing part and the reacting area of the electrode. Furthermore, since the fuel gas supplying manifolds 5, the fuel gas exhausting manifolds 7, the oxidant gas supplying manifolds 4 and the oxidant gas exhausting manifolds 6 are contacted with each other through the bipolar plate substrate 1, the hard frame 2a and the hard frame 2b, all of which are made of metal, and thereby the above construction makes it easy to wet the surfaces of each layer at the above gas sealing part around the manifolds due to the electrolyte oozing out of the electrolyte matrix 30; local cells are easy to be occurred on the metal surfaces around the manifolds, and consequently the conventional fuel cell bipolar plate has a problem that it can not operate for a long term stably in high output power.

Also, since the conventional fuel cell bipolar plate uses the hard frames as the gas seals, it is difficult to hold the sufficient amount of electrolyte for the gas seals around the manifolds in the close vicinity of the electrolyte matrix 30 at the gas sealing part, and then it is required to supply the electrolyte from the cell reacting area of the electrolyte matrix 30. Then, the electrolyte held at the cell reacting area of the electrolyte matrix 30 and held at the electrode part is shared by the electrolyte matrix 30 at the cell reacting area and the gas sealing part.

Consequently, the conventional fuel cell bipolar plate has problems that initially overplus electrolyte must be held in the cell reacting area, which damages the initial performances of the cell; that the utilizable amount of electrolyte in the cell reacting area is limited to shorten the life of the fuel cell bipolar plate; and that electrolyte is needed to move from the cell reacting area to the gas sealing part through the electrolyte matrix 30, which makes it difficult to fill up electrolyte quickly and attain the gas sealing performance, although they are preferable at the initial time after heating up of the stack.

Besides, in the conventional construction of the bipolar plate, since the gas sealing parts around the manifolds and the gas sealing parts around the electrode planes are in the close vicinity, it is difficult to use the widely used gasket materials whose principal ingredients are silica, alumina, talc and the like as the gaskets at the gas sealing parts around the manifolds for preventing the occurrence of the corrosion caused by the electrolyte having oozed out of the gas sealing parts around the electrode. Accordingly, the electrolyte matrix 30 which contains electrolyte having high reactivity in the aspects of the electrochemistry and the corrosion of materials must be used as the gasket, then the conventional construction of the bipolar plate has such problems in the aspect of the stability of gas sealing for a long term as the decrease of the wet sealing ability and the corrosion of the materials around the gasket, both of which are caused by the migration of the electrolyte to other places of the laminated cell as a result of the electrochemical reaction.

Also, the conventional construction has a tendency to produce the difference in height between the gas sealing part and the cell reacting area, and it is substantially extremely difficult to level the height. One of its reasons is that tolerances for manufacturing, for example about ±0.02~0.06 mm, are required for each member when the members of the bipolar plate such as the bipolar plate substrate 1, the hard frame 2a, the hard frame 2b, the oxidant gas side electrode 20, the fuel gas side electrode 25, the current collectors 24 and 26, and the corrugated plates 3 and 22 are manufactured, then it is very difficult to level the height at the gas sealing part and the cell reacting area in the aspects of manufacturing cost and technology owing to the accumulation of the tolerances. Another reason is that it is difficult practically and technically to level the height of both the parts always even when changes with the passage of time occur, because the electrodes 20 and 25 have the tendency of easily changing in thickness with the passage of time, for example the fuel gas side electrode 25 reduces in thickness from 10 to 20 μm for 10,000 hours in a typical condition.

Since such differences in height to occur inevitably exist on the boundary lines between the gas sealing part and the cell reacting area on both sides of the fuel gas side and the oxidant gas side through the electrolyte matrix 30, the conventional construction of the bipolar plate has a problem that cracks will easily occur in the electrolyte matrix 30 along the boundary line and thereby the fuel gas and the oxidant gas are mixed.

Next, another prior art for resolving the unevenness of the surface pressures between the gas sealing part and the cell reacting area will be described. FIG. 3 is a partly broken perspective view showing the conventional fuel cell bipolar plate which is illustrated in the Japanese Unexamined Patent Application Published under No. 75162/90 (Hei. 2), and in which the soft frame around the electrode plane and the soft frame around manifolds are constructed with the bipolar plate substrate in a body to form a sealing plane. In the figure, reference numeral 1 designates a bipolar plate substrate; numeral 4 designates an oxidant gas supplying manifold (or a supplying aperture); numeral 5 designates a fuel gas supplying manifold; numeral 6 designates an oxidant gas exhausting manifold; and numeral 7 designates a fuel gas exhausting manifold. On the fuel side where the fuel gas is supplied to a cell reacting area 12, only an outside soft frame 10, which intercepts gas, is attached at the outside of the fuel gas supplying manifold 5 and the fuel gas exhausting manifold 7; and on the opposite side of the cell reacting area 12 of the bipolar plate substrate 1, an inside soft frame 11 is attached together with the outside soft frame 10 for not supplying fuel gas to the cell reacting plane.

In the present bipolar plate constructed as described above, since the same member as the cell reacting plane is inserted into the soft frame, there happens no unevenness between the surface pressures of the sealing part of the soft frame surfaces and the cell reacting plane. But, since the fuel gas and the oxidant gas are partitioned by the inside soft frame 11, the electrolyte having oozed out of the sealing parts reacts to produce local cells, and thereby the corrosion of the soft frame is accelerated. Besides, from the view point of the construction, since it is required to weld the three members of the bipolar plate substrate 1, the inside soft frame 11 and the outside soft frame 10 respectively, the construction has a problem that processing is difficult and manufacturing cost is high.

SUMMARY OF THE INVENTION

In view of the foregoing, it is an object of the present invention to provide a fuel cell having the ability of gas sealing stable for a long term.

It is another object of the present invention to provide a fuel cell capable of distributing surface pressures to the electrode area and the sealing parts equally.

It is a further object of the present invention to provide a fuel cell capable of suppressing the corrosion due to electrolyte.

It is a further object of the present invention to improve the reliability of the welded part to form the bipolar plate.

It is a further object of the present invention to enable the easy supply of electrolyte to the electrolyte matrices being used as the gaskets of the gas sealing parts around manifolds.

It is a further object of the present invention to provide a fuel cell having the ability of gas sealing stable for a long term by suppressing the occurrence of the cracks of the electrolyte matrix in spite of the existence of the tolerances of each of its member, which tolerances are practically inevitable for manufacturing the members or owing to the nature of the members.

According to the first aspect of the present invention, for achieving the above mentioned objects, there is provided a molten carbonate fuel cell of an internal manifold type comprising a cell stack composed by stacking plural cells through a bipolar plate, each of the cells putting an electrolyte matrix between a fuel electrode and an oxidant electrode and generating by flowing fuel gas and oxidant gas through a fuel gas channel opposed to the fuel electrode and an oxidant gas channel opposed to the oxidant electrode respectively; a fuel gas supplying or exhausting manifold and an oxidant gas supplying or exhausting manifold for supplying or exhausting fuel gas or oxidant gas to the fuel gas channel or the oxidant gas channel respectively, the fuel gas supplying or exhausting manifold and the oxidant gas supplying or exhausting manifold being composed of a hole opened to an adjoining cell in stack respectively; and gas seals laid around the electrodes and the manifolds between each stacking layer; wherein the bipolar plate is designed to provide the gas seal around the electrode and the gas seal around the fuel gas manifold on the same plane and to separate the gas seal around the electrode and the gas seal around the oxidant gas manifold with a hollowed part on the fuel electrode side, and to provide the gas seal around the electrode and the gas seal around the oxidant gas manifold on the same plane and to separate the gas seal around the electrode and the gas seal around the fuel gas manifold with a hollowed part on the oxidant electrode side.

As stated above, in the molten carbonate fuel cell of an internal manifold type according to the first aspect of the present invention, since the bipolar plate is designed to provide the gas seal around the electrode and the gas seal around the fuel gas manifold on the same plane and to separate the gas seal around the electrode and the gas seal around the oxidant gas manifold with a hollowed part on the fuel electrode side, and to provide the gas seal around the electrode and the gas seal around the oxidant gas manifold on the same plane and to separate the gas seal around the electrode and the gas seal around the fuel gas manifold with a hollowed part on the oxidant electrode side, the fuel gas and the oxidant gas is surely separated by the hollowed part, then the molten carbonate fuel cell of an internal manifold type has the ability of gas sealing stable for a long term.

According to the second aspect of the present invention, there is provided a molten carbonate fuel cell of an internal manifold type described in the first aspect wherein the space of the hollowed part is opened to the outside gas.

As stated above, in the molten carbonate fuel cell of an internal manifold type, since the space of the hollowed part is opened to the outside atmospheric gas, the material forming the hollowed part, for example soft frame made in a gas seal part, does not separate fuel gas and oxidant gas directly, and thereby the generation of local cells can be suppressed even if the material forming the hollowed part is wetted by electrolyte.

According to the third aspect of the present invention, there is provided a molten carbonate fuel cell of an internal manifold type described in the first or the second aspect wherein the electrolyte matrix is separated to an electrode part matrix opposed to the electrode and the gas seal around the electrode and a manifold part matrix opposed to the gas seal around the manifold at the hollowed part.

As stated above, in the molten carbonate fuel cell of an internal manifold type according to the third aspect of the present invention, since the electrolyte matrix is used by being separated to an electrode part matrix opposed to the electrode and the gas seal around the electrode and a manifold part matrix opposed to the gas seal around the manifold at the hollowed part, there is no need to product a large sized electrolyte matrix, and thereby its manufacturing becomes easy and the qualities of the electrolyte matrix such as the decreasing dispersion in thickness and the number of pin holes can be improved.

According to the fourth aspect of the present invention, there is provided a molten carbonate fuel cell of an internal manifold type described in the third aspect which further comprises an electrolyte migrating mechanism in the hollowed part in order that the electrolyte held in the electrode part matrix and the electrolyte held in the manifold part matrix can migrate between both the matrix parts mutually.

As stated above, the molten carbonate fuel cell of an internal manifold type according to the fourth aspect of the present invention is constructed to comprise an electrolyte migrating mechanism in the hollowed part in order that the electrolyte held in the electrode part matrix and the electrolyte held in the manifold part matrix can migrate between both the matrix parts mutually, and consequently, the electrolyte is equally distributed to both the matrices and thereby the same sealing effect as that of the electrolyte matrix composed of one sheet can be obtained.

According to the fifth aspect of the present invention, there is provided a molten carbonate fuel cell of an internal manifold type described in any one of the first to the fourth aspects which further comprises a spacer in the hollowed part in order that surface pressure may be impressed on the hollowed part through the spacer in the stacking direction.

As stated above, the molten carbonate fuel cell of an internal manifold type according to the fifth aspect of the present invention is constructed to comprise a spacer in the hollowed part in order that surface pressure may be impressed on the hollowed part through the spacer in the stacking direction, and consequently, very fragile electrolyte matrices can be supported by the spacer and thereby the damage of the electrolyte matrices can be prevented.

According to the sixth aspect of the present invention, there is provided a molten carbonate fuel cell of an internal manifold type described in the fifth aspect wherein the spacer is at least one of an electrolyte matrix, a cathode electrode, a porous plate and a corrugated plate.

As stated above, in the molten carbonate fuel cell of an internal manifold type according to the sixth aspect of the present invention, the spacer is at least one of an electrolyte matrix, a cathode electrode, a porous plate and a corrugated plate, and consequently, the sufficient amount of oxygen can be supplied to the electrolyte matrices through the opened parts of the spacer at the time of the burn-out of binders, thereby sufficient burn-out can be executed. As the result, the electrolyte matrices supported by the spacer have functions of good affinity with electrolyte and of the well penetration of electrolyte, then the electrolyte matrices have sufficient functions as the migrating routes of electrolyte.

According to the seventh aspect of the present invention, there is provided a molten carbonate fuel cell of an internal manifold type described in any one of the first to the sixth aspects which further comprises electrolyte in the space of the hollowed part so as to supply the electrolyte to the electrolyte matrix.

As stated above, the molten carbonate fuel cell of an internal manifold type according to the seventh aspect of the present invention is constructed to comprise electrolyte in the space of the hollowed part so as to supply the electrolyte to the electrolyte matrix, and consequently, it becomes possible to hold further more electrolyte, and thereby it becomes possible to elongate the life of the fuel cell.

According to the eighth aspect of the present invention, there is provided a molten carbonate fuel cell of an internal manifold type described in the first aspect wherein the bipolar plate is composed by joining one piece type soft frames on both surfaces of a flat plate-like bipolar plate substrate for separating fuel gas and oxidant gas in the stacking direction at a part opposed to the electrode, each of the one piece type soft frames being composed of one body installing all the gas seals around the electrode and around the manifolds for supplying or exhausting fuel gas or oxidant gas on it.

As stated above, in the molten carbonate fuel cell of an internal manifold type according to the eighth aspect of the present invention, since the bipolar plate is composed by joining one piece type soft frames on both surfaces of a flat plate-like bipolar plate substrate for separating fuel gas and oxidant gas in the stacking direction at a part opposed to the electrode, each of the one piece type soft frames being composed of one body installing all the gas seals around the electrode and around the manifolds for supplying or exhausting fuel gas or oxidant gas on it, the number of components and the man-hour of assembly can be decreased, and further positioning accuracy is improved at the time of joining the soft frames.

According to the ninth aspect of the present invention, there is provided a molten carbonate fuel cell of an internal manifold type described in the first aspect wherein the bipolar plate comprises: a flat plate-like bipolar plate substrate for separating fuel gas and oxidant gas in the stacking direction at a part opposed to the electrode; a frame-like one piece type soft frame for fuel gas composed of one body installing the gas seal around the electrode and the gas seal around the fuel gas manifold on it and a first frame-like soft frame for a manifold installing the gas seal around the oxidant gas manifold, the frame-like one piece type soft frame for fuel gas and the first frame-like soft frame for a manifold being respectively joined on the anode electrode side of the bipolar plate substrate; and a frame-like one piece type soft frame for oxidant gas composed of one body installing the gas seal around the electrode and the gas seal around the oxidant gas manifold on it and a second frame-like soft frame for a manifold installing the gas seal around the fuel gas manifold, the frame-like one piece type soft frame for oxidant gas and the second frame-like soft frame for a manifold being respectively joined on the cathode electrode side of the bipolar plate substrate.

As stated above, in the molten carbonate fuel cell of an internal manifold type according to the ninth aspect of the present invention, since the bipolar plate comprises: a flat plate-like bipolar plate substrate for separating fuel gas and oxidant gas in the stacking direction at a part opposed to the electrode; a frame-like one piece type soft frame for fuel gas composed of one body installing the gas seal around the electrode and the gas seal around the fuel gas manifold on it and a first frame-like soft frame for a manifold installing the gas seal around the oxidant gas manifold, the frame-like one piece type soft frame for fuel gas and the first frame-like soft frame for a manifold being respectively joined on the fuel electrode side of the bipolar plate substrate; and a frame-like one piece type soft frame for oxidant gas composed of one body installing the gas seal around the electrode and the gas seal around the oxidant gas manifold on it and a second frame-like soft frame for a manifold installing the gas seal around the fuel gas manifold, the frame-like one piece type soft frame for oxidant gas and the second frame-like soft frame for a manifold being respectively joined on the cathode electrode side of the bipolar plate substrate; each soft frame can easily be manufactured by, for example, simply drawing and likely.

According to the tenth aspect of the present invention, there is provided a method of manufacturing a bipolar plate for a molten carbonate fuel cell of an internal manifold type comprising the steps of: obtaining a prescribed shaped soft frame by drawing a flat plate; obtaining a corrosion protection layer to electrolyte by aluminum coating at least at a gas seal around an electrode of the soft frame; and joining the soft frame on a bipolar plate substrate.

As stated above, the method of manufacturing a bipolar plate for a molten carbonate fuel cell of an internal manifold type according to the tenth aspect of the present invention, since the following steps are executed in order: obtaining a prescribed shaped soft frame by drawing a flat plate; obtaining a corrosion protection layer to electrolyte by aluminum coating at least at a gas seal around an electrode of the soft frame; and joining the soft frame on a bipolar plate substrate; bipolar plates having corrosion protection layers at parts exposed to electrolyte can easily be obtained.

According to the eleventh aspect of the present invention, there is provided a fuel cell comprising plural cells stacked on each other through a bipolar plate, each of the cells putting an electrolyte matrix between an anode electrode and a cathode electrode and generating by flowing fuel gas and oxidant gas through a fuel gas channel opposed to the fuel electrode and an oxidant gas channel opposed to the oxidant electrode respectively; wherein the bipolar plate comprises: a flat plate-like bipolar plate substrate for separating fuel gas and oxidant gas in the stacking direction at a part opposed to the electrodes; and sealing frames joined on both sides of the bipolar plate substrate and forming at least gas seals around the electrodes, the sealing frames being joined by plural joining lines respectively at the parts contacting on the surfaces of the bipolar plate substrate.

As stated above, since the fuel cell according to the eleventh aspect of the present invention comprises plural cells stacked on each other through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; wherein the bipolar plate comprises: a flat plate-like bipolar plate substrate for separating fuel gas and oxidant gas in the stacking direction at a part opposed to the electrodes; and sealing frames joined on both sides of the bipolar plate substrate and forming at least gas seals around the electrodes, the sealing frames being joined by plural joining lines respectively at the parts contacting on the surfaces of the bipolar plate substrate; the sealing frames can surely be joined, and thereby the gas leakage from the joining parts due to defective joining, corrosion and the like can be suppressed.

According to the twelfth aspect of the present invention, there is provided a fuel cell described in the eleventh aspect wherein the plural joining lines cross each other.

As stated above, since the fuel cell according to the twelfth aspect of the present invention is the fuel cell described in the eleventh aspect wherein the plural joining lines cross each other, the sealing frames can more surely be joined, and thereby the gas leakage from the joining parts due to defective joining, corrosion and the like can be suppressed.

According to the thirteenth aspect of the present invention, there is provided a molten carbonate fuel cell composed by laminating plural cells through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; wherein the bipolar plate comprises: a flat plate-like bipolar plate substrate for separating fuel gas and oxidant gas in the stacking direction at a part opposed to the electrodes, and sealing frames joined on both sides of the bipolar plate substrate and forming at least gas seals around the electrodes; and wherein the bipolar plate has a corrosion protection layer on the surface at a region exposed to fuel gas atmosphere, the joining of the sealing frames at the corrosion protection layer on the bipolar plate substrate is performed at the parts where the sealing frames contact on the surface of the corrosion protection layer, and the penetration of joining material into the parts pierces through the corrosion protection layer.

As stated above, in the fuel cell according to the thirteenth aspect of the present invention; the bipolar plate comprises: a flat plate-like bipolar plate substrate for separating fuel gas and oxidant gas in the stacking direction at a part opposed to the electrodes, and sealing frames joined on both sides of the bipolar plate substrate and forming at least gas seals around the electrodes; the above bipolar plate substrate has a corrosion protection layer on the surface at a region exposed to fuel gas atmosphere; the joining of the sealing frames at the corrosion protection layer on the bipolar plate substrate is performed at the parts where the sealing frames contact on the surface of the corrosion protection layer; and the penetration of joining material into the parts pierces through the corrosion protection layer; and consequently, the sealing frames can surely be joined, and thereby the gas leakage from the joining parts due to defective joining, corrosion and the like can be suppressed.

According to the fourteenth aspect of the present invention, there is provided a fuel cell comprising: a stack composed by laminating plural cells through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; a fuel side gas sealing part adjoining anode electrode parts; and oxidant side gas sealing part opposed to the fuel side gas sealing part in regard to the electrolyte matrix and adjoining the cathode electrode; wherein the positions of each boundary line between each of the sealing parts and each electrode adjoining the gas sealing parts of each side is different to each other in regard to the plane of the electrolyte matrix.

As stated above, the fuel cell according to the fourteenth aspect of the present invention comprises: a stack composed by laminating plural cells through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; a fuel side gas sealing part adjoining anode electrode parts; and an oxidant side gas sealing part opposed to the fuel side gas sealing part in regard to the electrolyte matrix and adjoining the cathode electrode; wherein the positions of each boundary line between each of the gas sealing parts and each electrode adjoining the gas sealing part of each side is different to each other in regard to the plane of the electrolyte matrix; and consequently, each one side surface supporting the electrolyte matrix is always a flat plane having no difference in level on each boundary line, then the occurrences of cracks of the electrolyte matrices due to the difference in level between the gas sealing part and the cell reacting area are greatly decreased, and thereby stable cell performances can be obtained.

According to the fifteenth aspect of the present invention, there is provided a fuel cell described in the fourteenth aspect wherein each of the fuel gas supplying or exhausting manifold and the oxidant gas supplying or exhausting manifold is an internal manifold composed of a hole opened to an adjoining cell in the stack.

As stated above, according to the fifteenth aspect of the present invention, in the fuel cell described in the fourteenth aspect, since each of the fuel gas supplying or exhausting manifold and the oxidant gas supplying or exhausting manifold is an internal manifold composed of a hole opened to an adjoining cell in the stack, sufficient gas sealing function can be obtained by the wet sealing of electrolyte matrices having no cracks, and thereby the manifolds which have the very little amount of leakage of gas can be formed.

According to the sixteenth aspect of the present invention, there is provided a fuel cell described in the fourteenth or the fifteenth aspect wherein the width of the fuel gas sealing part is wider than the width of the oxidant gas sealing part opposed to the fuel gas sealing part in regard to the electrolyte matrix.

As stated above, according to the sixteenth aspect of the present invention, in the fuel cell described in the fourteenth or the fifteenth aspect, since the width of the fuel gas sealing part is wider than the width of the oxidant gas sealing part opposed to the fuel side gas sealing part in regard to the electrolyte matrix, the sealing of the fuel gas which is more dangerous and more decreases cell performance in case of leakage becomes surer.

According to the seventeenth aspect of the present invention, there is provided a molten carbonate fuel cell of an internal manifold type comprising: a stack composed by stacking plural cells through a bipolar plate, each of the cells putting an electrolyte matrix holding electrolyte in its electrolyte holding member between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; and soft frames arranged on both sides of the bipolar plate separating fuel gas and oxidant gas in the stacking direction at the part opposed to the electrodes, the soft frames forming gas sealing parts around the electrodes and the manifolds; wherein each of the gas sealing parts around the manifolds comprises a porous gasket material and electrolyte held in the inside of the soft frames and changing into liquid state at the operation temperature of the fuel cell to be held in a vacant space in the inside of the porous gasket material.

As stated above, the molten carbonate fuel cell of an internal manifold type according to the seventeenth aspect of the present invention comprises: a stack composed by stacking plural cells through a bipolar plate, each of the cells putting an electrolyte matrix holding electrolyte in its electrolyte holding member between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; and soft frames arranged on both sides of the bipolar plate separating fuel gas and oxidant gas in the stacking direction at the part opposed to the electrodes, the soft frames forming gas sealing parts around the electrodes and the manifolds; wherein each of the gas sealing parts around the manifolds comprises a porous gasket material and electrolyte held in the inside of the soft frames and changing into liquid state at the operation temperature of the fuel cell to be filled in a vacant space in the inside of the porous gasket material; and consequently, the gas sealing ability of the manifolds can rapidly be established at the time of heating up of the fuel cell, and the sufficient amount of electrolyte which is needed by the electrolyte matrices at the gas sealing parts can be held in the soft frames, thereby the sufficient ability of gas sealing can be obtained without providing another new or complex space or construction. Furthermore, since the same content of electrolyte is used at the sealing parts around the manifolds and the cell reacting parts, there happens no loss due to the reactions of both the electrolyte.

According to the eighteenth aspect of the present invention, there is provided a molten carbonate fuel cell of an internal manifold type described in the seventeenth aspect wherein the porous gasket material is the same material as that of the electrolyte support member.

As stated above, in the molten carbonate fuel cell of an internal manifold type according to the eighteenth aspect of the present invention, since the porous gasket material is the same material as that of the electrolyte support member, the porous gasket material is extremely stable to electrolyte owing to the sameness of material. Also, since the materials put between two bipolar plates are all the same at the cell reacting area and gas sealing parts, the mechanical characteristics of the electrolyte matrices and the porous gasket materials, and thereby no one-sided shrinkage and the like happen. Consequently, the sealing characteristics equal on all surfaces can be obtained.

According to the nineteenth aspect of the present invention, there is provided a molten carbonate fuel cell of an internal manifold type described in the first aspect wherein the electrolyte matrix is arranged to be opposed to the electrodes and the gas seals supplied around the electrodes, and each of the gas seals around the manifolds is a manifold gasket material not containing electrolyte, the manifold gasket material being arranged opposingly.

As stated above, in the molten carbonate fuel cell of an internal manifold type according to the nineteenth aspect of the present invention, since the electrolyte matrix is arranged to be opposed to the electrodes and the gas seals supplied around the electrodes, and each of the gas seals around the manifolds is a manifold gasket material not containing electrolyte, the manifold gasket material being arranged opposingly, it is possible to attain the sealing characteristic of the gas seals around the manifolds without using the wet sealing by means of electrolyte. Consequently, there happen no such problems as the corrosion due to electrolyte, the decreasing of the gas sealing performance due to the starvation of electrolyte caused by the migration of the electrolyte, and thereby the gas sealing performance stable for a long term can be obtained.

According to the twentieth aspect of the present invention, there is provided a molten carbonate fuel cell of an internal manifold type described in the nineteenth aspect wherein the manifold gasket material comprises a porous gasket material and a wet sealing material changing into a liquid state at the operation temperature of the fuel cell to be supported in a vacant space in the inside of the porous gasket material.

As stated above, in the molten carbonate fuel cell of an internal manifold type according to the twentieth aspect of the present invention, since the manifold gasket material comprises a porous gasket material and a wet sealing material changing into a liquid state at the operation temperature of the fuel cell to be filled in a vacant space in the inside of the porous gasket material, the vacant space in the gasket is filled up by liquid, and thereby a good gas sealing performance can be obtained. Besides, the fuel cell described in the first aspect is designed to separate the gas seals around the cell reacting areas and the gas seals around the manifolds, accordingly the materials for wet sealing different from the electrolyte supported in the electrolyte matrices can be used for resolving the problem of corrosion owing to the electrolyte at these parts.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the present invention will now be described in detail with the accompanying drawings to be referred.

EMBODIMENT 1

Figure 4:
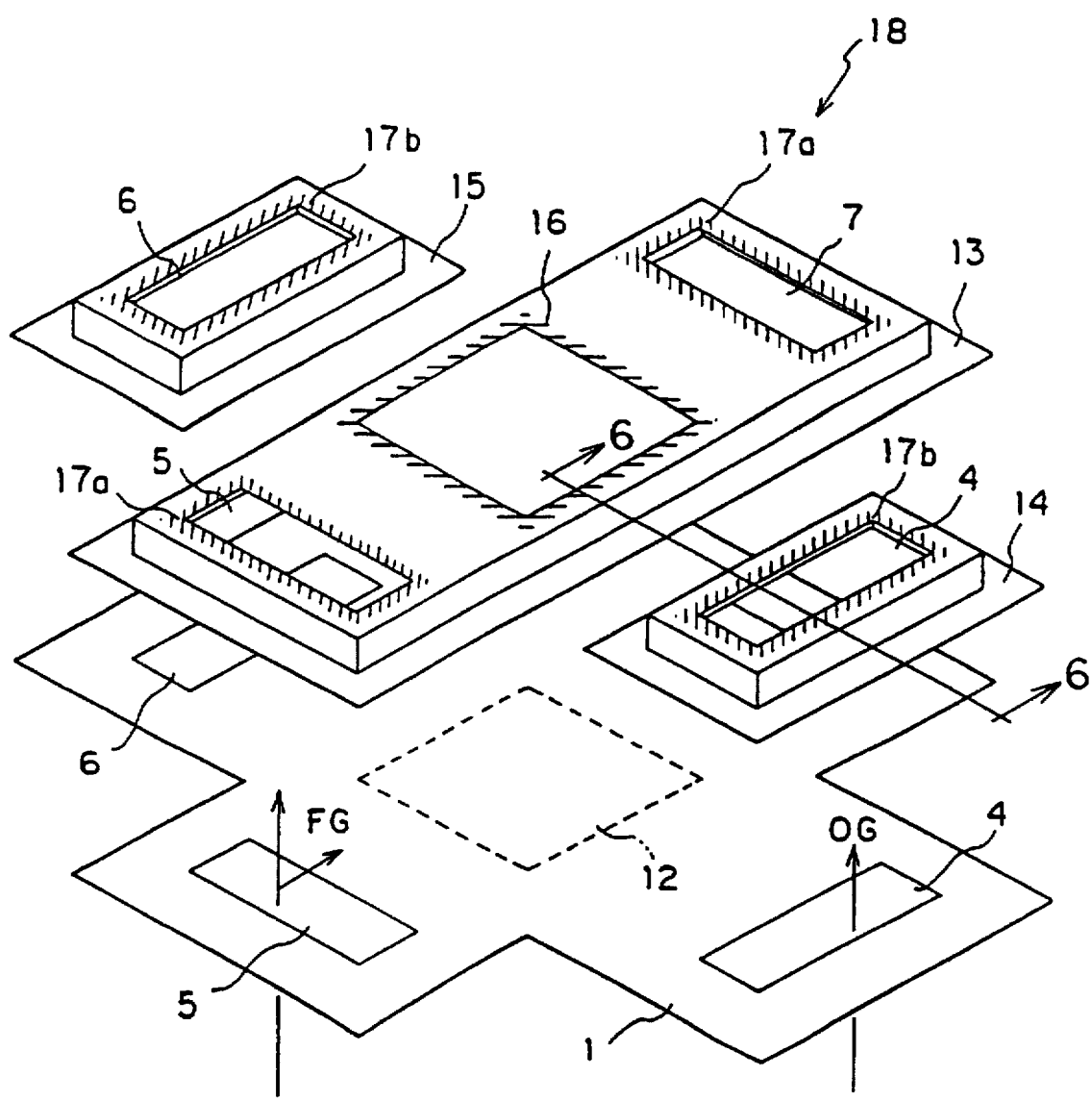
FIG. 4 is an separated perspective view showing the fuel gas side surface of the bipolar plate of the embodiment 1.
Figure 5:
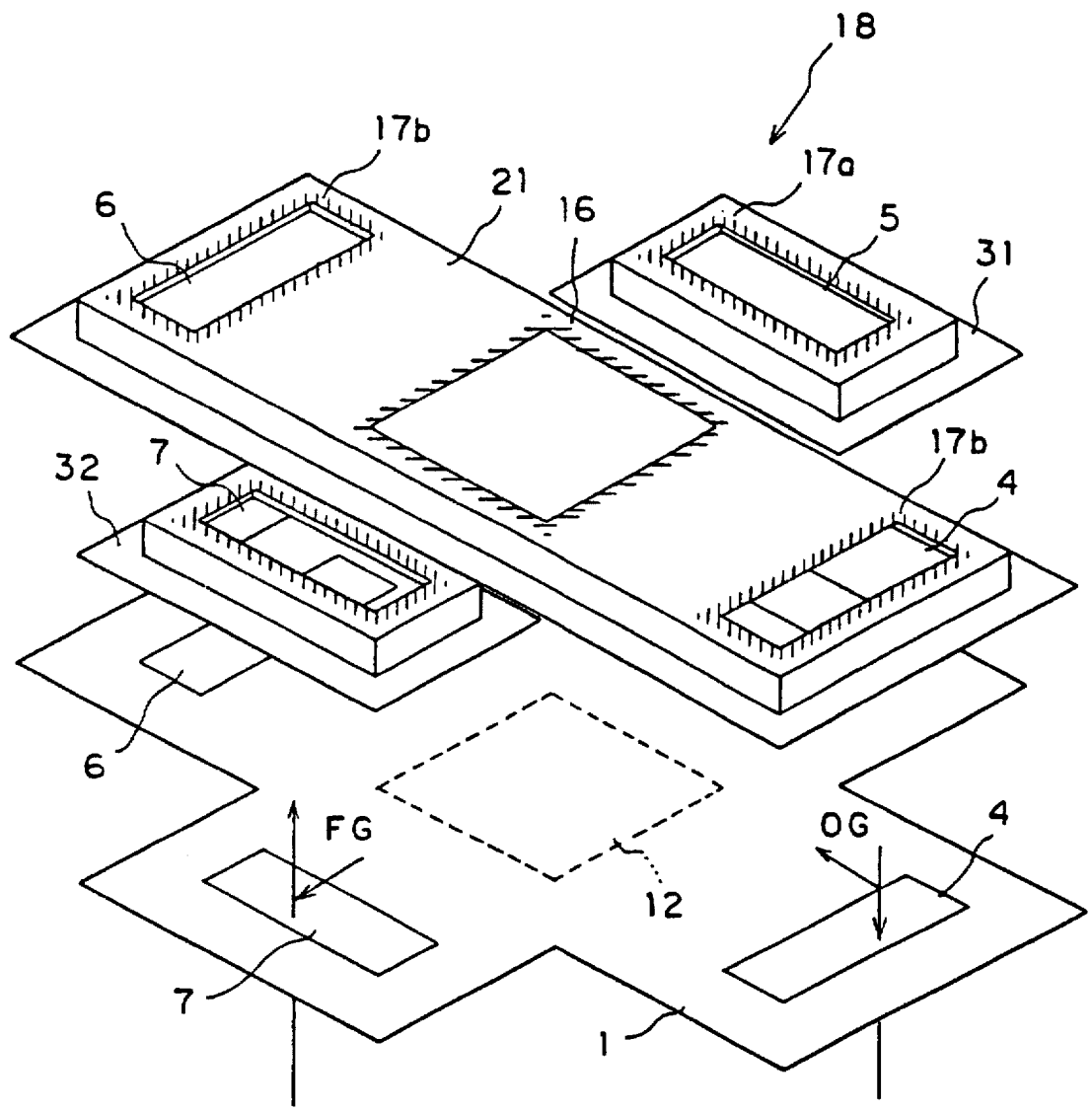
FIG. 5 is an exploded perspective view showing the oxidant gas side surface of the bipolar plate of the embodiment 1.

FIG. 4 is an exploded perspective view showing the structure of a bipolar plate 18 which is seen from the fuel gas side; and FIG. 5 is an exploded perspective view showing the structure of the bipolar plate 18 which is seen from the oxidant gas side. In FIG. 4, reference numeral 1 designates a bipolar plate substrate, on whose four fringes are opened an oxidant gas supplying manifold 4, an oxidant gas exhausting manifold 6, a fuel gas supplying manifold 5 and a fuel gas exhausting manifold 7 respectively. Reference numeral 12 designates a cell reacting area. On the bipolar plate substrate 1, a one piece type soft frame for fuel gas 13 is joined to the bipolar plate substrate 1 with contacting surface areas, which soft frame 13 has a sealing area where a sealing part 16, shown with hatching for clarifying, around the cell reacting area 12 on the side of the fuel gas and sealing parts 17a, shown with hatching for clarifying, around the manifolds on the fuel gas side are attached. Furthermore, a soft frame for the manifold of the entrance of oxidant gas 14 which has a sealing part 17b, shown with hatching for clarifying, around the manifold on the side of the entrance of oxidant gas and a soft frame for the manifold of the exit of oxidant gas 15 which has a sealing part 17b, shown with hatching for clarifying, around the manifold on the side of the exit of oxidant gas are joined to the bipolar plate substrate 1 at the positions opposing each other with the one piece type soft frame for fuel gas 13 between. Besides, arrows FG indicate the flowing directions of the fuel gas, and an arrow OG indicates the flowing direction of the oxidant gas.

As described above, on the fuel gas side surfaces of the bipolar plate shown in FIG. 4, it is required to introduce fuel gas into the fuel gas channel held on the cell reacting area 12 from the fuel gas supplying manifold 5, and to exhaust the reacted fuel gas to the fuel gas exhausting manifold 7. Accordingly, with the purpose of securing the flow of the fuel gas between the fuel gas supplying manifold 5, the cell reacting area 12 and the fuel gas exhausting manifold 7 on the fuel gas side surface, the one piece type soft frame for fuel gas 13 which unifies the sealing part 16 around the cell reacting area 12 and the sealing parts 17a around the manifolds is used for composing the above three parts. On the other hand, because the oxidant gas is not needed to the cell reaction on the fuel gas side surface, the oxidant gas supplying manifold 4 and the oxidant gas exhausting manifold 6 are respectively composed of the soft frame for the manifold of the entrance of oxidant gas 14 and the soft frame for the manifold of the exit of oxidant gas 15, both of which have a closed seal.

Figure 1:
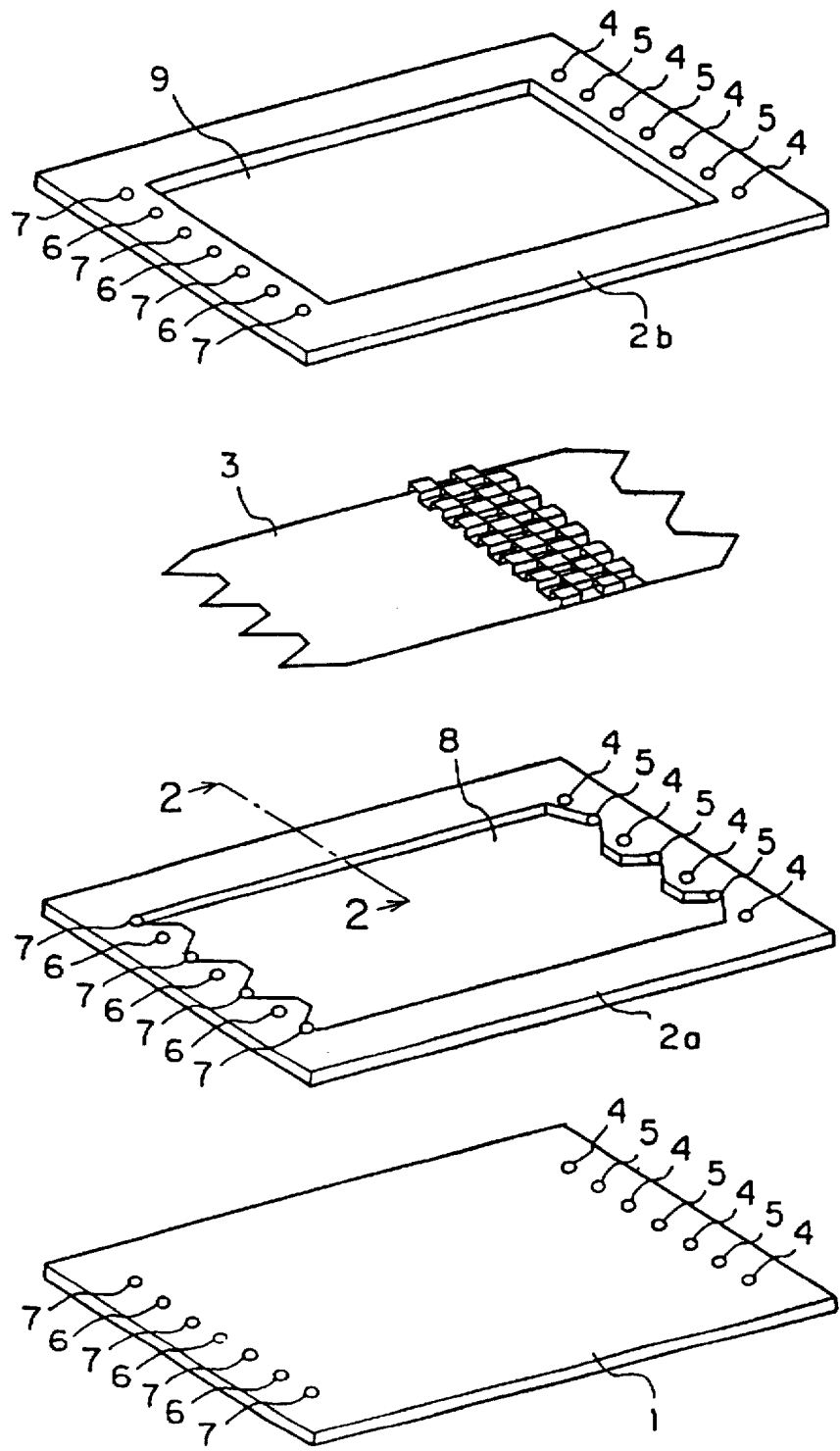
FIG. 1 is a separated perspective view showing a conventional bipolar plate components.

Next, on the oxidant gas side surface, shown in FIG. 5, which is the turned over surface of the oxidant gas side surface (refer to FIG. 1) of the bipolar plate, it is required to introduce oxidant gas into the cathode electrode held on the cell reacting area 12 from the oxidant gas supplying manifold 4, and to exhaust the reacted oxidant gas to the oxidant gas exhausting manifold 6. Accordingly, with the purpose of securing the flow of the oxidant gas between the oxidant gas supplying manifold 4, the cell reacting area 12 and the oxidant gas exhausting manifold 6 on the oxidant gas side surface, the one piece type soft frame for oxidant gas 21 which unifies the sealing part 16 around the cell reacting area 12 on the oxidant gas side and the sealing parts 17b around the manifolds on the oxidant gas side is used for composing the above three parts. On the other hand, because the fuel gas is not needed to the cell reaction on the oxidant gas side surface, the fuel gas supplying manifold 5 and the fuel gas exhausting manifold 7 are respectively composed of a soft frame for the manifold of the entrance of fuel gas 31 and a soft frame for the manifold of the exit of fuel gas 32, both of which have a closed seal.

As described above, the bipolar plate 18 is formed by joining the one piece type soft frame for fuel gas 13, the soft frame for the manifold of the entrance of oxidant gas 14 and the soft frame for the manifold of the exit of oxidant gas 15 on the bipolar plate substrate 1 on the fuel gas side, and by joining the one piece type soft frame for oxidant gas 21, the soft frame for the manifold of the entrance of fuel gas 31 and the soft frame for the manifold of the exit of fuel gas 32 on the bipolar plate substrate 1 on the oxidant gas side.

A cell stack is composed by installing prescribed materials to be laminated such as electrodes, current collectors, corrugated plates and spacers for the inside of soft frames on the bipolar plates 18, and by putting an electrolyte matrix which functions as an electrolyte matrix of the cell and a gasket for sealing the gas flowing through the manifolds between the above plural bipolar plates 18.

Figure 6:
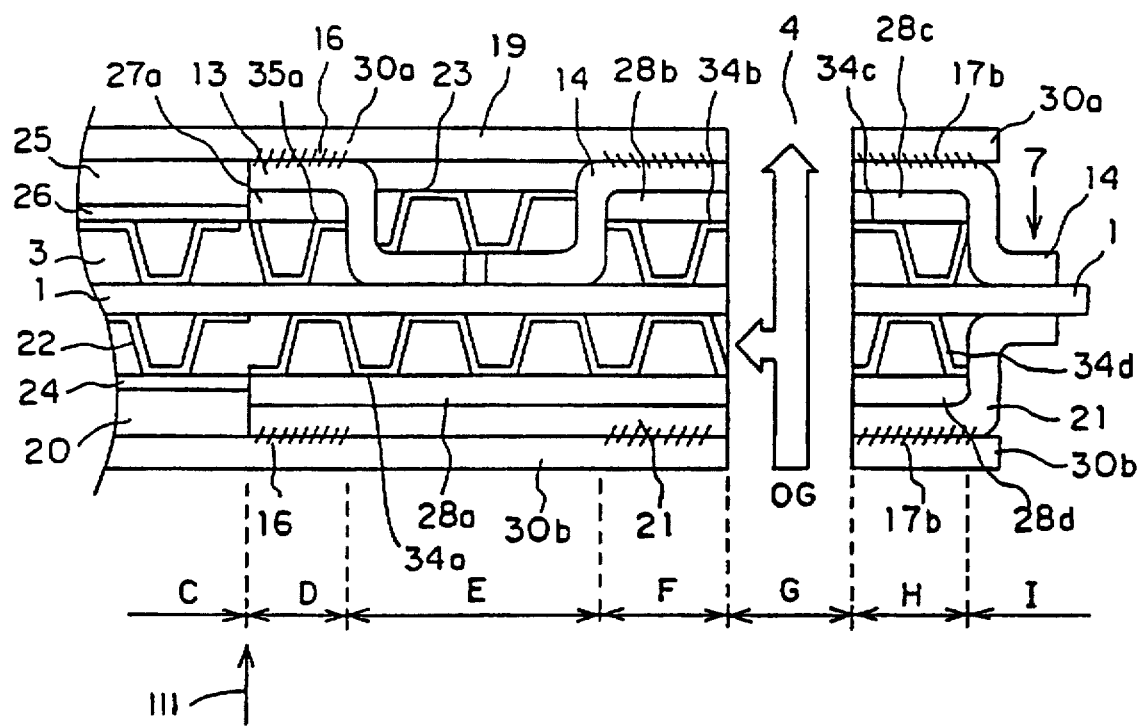
FIG. 6 is a sectional view taken substantially along the line A—A of the bipolar plate shown in FIG. 4.

FIG. 6 shows the A—A cross section in FIG. 4. In the figure, the part C indicates the cell reacting area 12, where the corrugated plate for the fuel gas in the cell part 3, the current collector 26 and the anode electrode 25 are laminated on the top surface of the bipolar plate substrate 1, and the corrugated plate for the oxidant gas in the cell part 22, the current collector 24 and the cathode electrode 20 are similarly laminated on the bottom surface of the bipolar plate substrate 1.

The part D indicates the sealing part around the cell reacting planes (or the electrode surfaces), where the sealing is done at the sealing part 16 between the one piece type soft frame for fuel gas 13 and an electrolyte matrix 30a above the bipolar plate substrate 1, and where a fuel gas side plate type spacer 27a and a corrugated type spacer for fuel gas 35a are inserted in the inside of the one piece type soft frame for fuel gas 13. A corrugated type spacer for oxidant gas 34a and an oxidant gas side plate type spacer 28a are inserted in a state of one body at the parts E and F in the inside of the one piece type soft frame for oxidant gas 21 on the bottom side of the bipolar plate substrate 1, and further the sealing is done at the sealing part 16 between the one piece type soft frame for oxidant gas 21 and an electrolyte matrix 30b.

The part E is a part where each of the soft frames 13 and 14 and the bipolar plate substrate 1 are welded. At the upper part of the welded part there is a hollowed part between the one piece type soft frame for fuel gas 13 and the soft frame for the manifold of the entrance of oxidant gas 14, and in the hollowed part for example a corrugated plate type spacer for the hollowed part 23 and a plate type spacer for the hollowed part 19 are filled up as spacers for making the height of the top surface of the hollowed part about the same as that of the top surface of the wet seal. For example a cathode electrode, a perforated plate, an electrolyte matrix or the like is used as the flat plate type spacer for the hollowed part 19.

The under part of the bipolar plate substrate 1 at the pat F is an introducing part for oxidant gas (referred to as OG in FIG. 6) from the oxidant gas supplying manifold 4 into the cell reacting area. The upper part of the bipolar plate substrate 1 at the part F is composed of the soft frame for the manifold of the entrance of oxidant gas 14 and the spacers filled up between the soft frame 14 and the bipolar plate substrate 1, which spacers are a corrugated type spacer for oxidant gas 34b and an oxidant gas side plate type spacer 28b.

The part G is the oxidant gas supplying manifold 4, and the part G is opened vertically in accordance with the number of the stacking cells.

The under part of the bipolar plate substrate 1 at the part H is a sealing part around the manifold of the one piece type soft frame for oxidant gas 21, which is constructed symmetrically to the soft frame for the manifold of the entrance of oxidant gas 14 arranged at the upper part of the bipolar plate substrate 1 with regard to the bipolar plate substrate 1. Reference numerals 28c and 28d designate plate type spacers for oxidant gas; and numerals 34c and 34d designate corrugated type spacers for oxidant gas.

The part I is a part where the soft frame for the manifold of the entrance of oxidant gas 14 and the one piece type soft frame for oxidant gas 21 are joined to the bipolar plate substrate 1.

Figure 7:
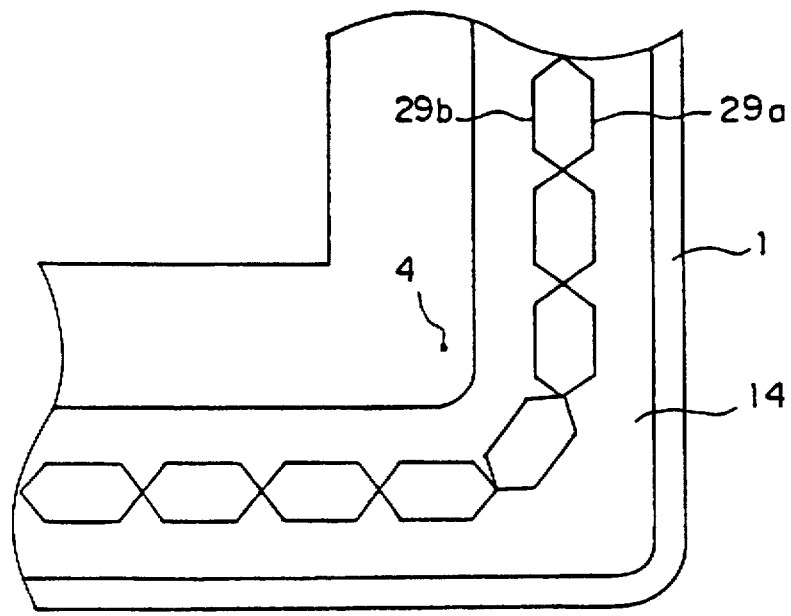
FIG. 7 is a plan view showing the joined part of the bipolar plate shown in FIG. 6 in case of being observed from the direction of B.

FIG. 7 shows the joined part of the part I shown in FIG. 6 which is observed from the direction of B. In FIG. 7, reference numerals 29a and 29b designate weld lines. In this example, the welding is implemented two times, which welding is done, for example, in such a way to weld the soft frame 14 in parallel with the space of approximately 2 mm and to weld it so as to cross the weld lines 29a and 29b at each approximately 10 mm.

Next, its operation will be described. The fuel gas (referred to as FG in the above figures) supplied from the fuel gas supplying manifold 5 passes through the cell reacting area 12 to be lead to the fuel gas exhausting manifold 7. At this time the fuel gas is separated from the atmospheric air by the one piece type soft frame for fuel gas 13. On the other hand, the inflow of the oxidant gas (referred to as OG in the above figures) in the oxidant gas supplying manifold 4 onto the upper side surface of the bipolar plate substrate 1 is intercepted by the soft frame for the manifold of the entrance of oxidant gas 14, and conversely the oxidant gas is lead into the cell reacting area 12 by the one piece type soft frame for oxidant gas 21 similarly in the case of the fuel gas at the under part of the bipolar plate substrate 1.

The surfaces of each of the soft frames 13, 14 and 15 contacted to the electrolyte matrices 30a and 30b (or the sealing parts 16, 17a and 17b) are sealed by electrolyte in a wet state, and the sealing part 16 sealed in a wet state around the cell reacting area 12 and the sealing areas 17a and 17b sealed in a wet state around the manifolds 4, 5, 6 and 7 are supported by the plate type spacer for the hollowed part 19 and the corrugated plate type spacer for the hollowed part 23 in the state that the electrolyte matrices 30a and 30b are connected to be opened in the hollowed parts respectively. As the result, no hindrance to the migration of the electrolyte such as the breakdown of the electrolyte matrix at the hollowed part happens, and the electrolyte is contained uniformly on the surfaces. Besides, since the enough amount of the outside air touches the electrolyte matrix 30a at the upper part of the hollowed part (or the part E shown in FIG. 6) through the corrugated plate type spacer for the hollowed part 23 and the porous flat plate type spacer for the hollowed part 19, there is sufficient capability to oxidize the combustible ingredients in the electrolyte matrix 30a by the burnout at heating up.

Besides, since the space of the hollowed part is opened to the outside ambient gas and the inside and the outside surfaces of each soft frame has no part on which the fuel gas and the oxidant gas touch simultaneously, the generation of local cells is suppressed even if the surfaces are wet by electrolyte.

Besides, since the welds of the bipolar plate substrate 1 and the fringes of each soft frame in the present embodiment are all done in the flat plane of the bipolar plate substrate 1, the reliability of welding is improved and the welding using a laser which is controlled by a computer and fitted to mass production can be applied, then it has a great advantage for reducing the cost of production, too. Furthermore, in the present embodiment, the welding is done twice and the weld lines 29a and 29b are designed to cross each other as shown in FIG. 7. Since the welding is done twice in such a way, the leakage of the inside gas to the outside is suppressed even when either of the weld line 29a or the weld line 29b loses its performance due to the corrosion or the like. Besides, since the weld lines cross each other, and especially at the cross points enough weld depth can be obtained, the enduring force to the tearing off force to the upper and lower side directions of a tangential line of the outer peripheries of the soft frames can be obtained, and thereby it is possible to attain the welding having higher reliability.

Also, the bipolar plate substrate 1 is usually made of complex materials which is provided with a corrosion protection layer to electrolyte, for example a layer of nickel, copper or the like which has the thickness about 0.05~0.1 mm, especially only on the regions, which are kept in the atmosphere of fuel gas during the operation, of the surfaces of a base material made of, for example, metal material like stainless steel. Nickel or copper is stable in the atmosphere of fuel gas at the high temperature around 650° C. which is the operating temperature of a fuel cell, but is easily oxidized to lose its strength in the atmosphere of oxidant gas. Accordingly, the following care is needed in the case where the corrosion protection layer has the probability of being oxidized by the weld of the soft frames in the regions where the corrosion protection layer is provided of the bipolar plate substrate 1. Namely, the welding of the soft frames should be done to the stainless steel base material directly after removing the corrosion protection layer by for example etching or performing a like method. Or, in case of welding the soft frames on the corrosion protection layer without removing it, it must be cared that the penetration of metal should be reached to the stainless base material through the corrosion protection layer. In either case, the necessary depth of the penetration of welding into the stainless steel base material depends on the depth of the permeation of the corrosion into the stainless steel base material by electrolyte. For example, in the case where the base material is the stainless steel 316L or 310S, the depth of corrosion is about 20~50 μm for 10,000 hours in a typical operation condition, and the amount of the penetration of welding around the depth of corrosion or more is required.

The welding method in which the soft frames are welded on the corrosion protection layer without removing it has advantages that the process of removing the corrosion protection layer is not required, and that it can avoid the risk that the boundary line between the region having the corrosion protection layer and the region not having the corrosion protection layer after removing the corrosion protection layer is shifted from the weld line to reveal a boundary region which is in the atmosphere of fuel gas and has no corrosion protection layer and thereby the corrosion of the bipolar plate substrate 1 in the region proceeds.

In the case where the welding is performed by means of the laser welding, the depth of the penetration of the weld can easily be adjusted by adjusting the output of the laser welding or the iris of the laser beam.

The bipolar plate can ordinary be obtained by joining the soft frames formed to a prescribed shape, for example, by drawing a thin plate of stainless steel material to the bipolar plate substrate 1. But, the corrosion protection to electrolyte is not sufficient especially at the sealing parts which are directly exposed to the electrolyte matrix as it is. Accordingly, for the sake of improving the corrosion protection, corrosion treatment is generally performed on the sealing parts especially or the regions adjoining the sealing part as occasion demands. To be concrete, for example a diffusion layer of aluminum is provided on the surface of the bipolar plate substrate. As for the procedure, for example there is known the method in which an aluminum layer is provided on the surface of a base material of stainless steel by the method of thermal spraying or the like, and after that heat treatment is performed in the high temperature (for example about 800°~1,000° C.) and deoxidized atmosphere. Such a corrosion protection process is generally performed after the bipolar plate is manufactured by joining components (or the soft frames and the bipolar plate substrate) on the bipolar plate substrate.

As for another manufacturing procedure, there is known the procedure in which at first each component is respectively treated for corrosion protecting after manufacturing the soft frames and after that a bipolar plate is made up by joining each component. In this manufacturing procedure, the heat treatment can be performed in the phase of components having comparatively small shapes before welding, and consequently a relatively small heating furnace is available, thereby the manufacturing costs of bipolar plates can be reduced. Besides, since the objects to be treated with heat do not have complex constructions after welding, the amount of heat distortion of the bipolar plate accompanied by the heat treatment can be reduced, and thereby accurate bipolar plates can be obtained.

EMBODIMENT 2

Figure 8:
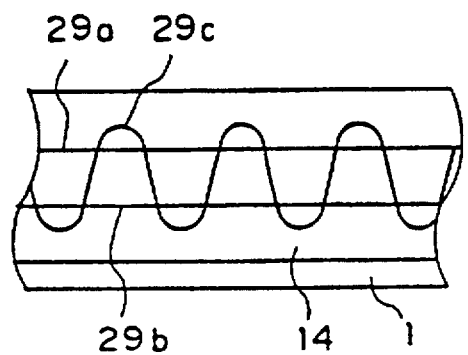
FIG. 8(a) and FIG. 8(b) are plan views showing the joined parts of the bipolar plate of the embodiment 2.
Figure 8:
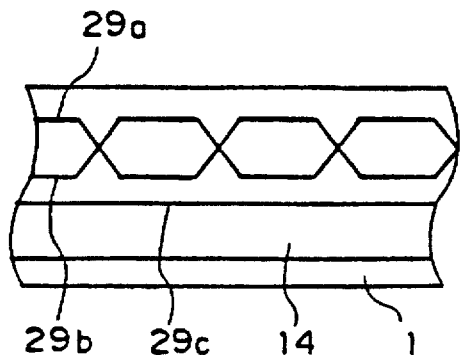

The embodiment of the weld lines is not limited to the crossed two lines as shown in FIG. 7 of the above embodiment 1, but the same or more effect can be expected by the use of three weld lines shown in FIG. 8(a) and FIG. 8(b), and in this case there is not necessary to cross them particularly.

EMBODIMENT 3

The third embodiment of the present invention will now be described. In the above embodiment 1, on the fuel gas side of the bipolar plate 18 the one piece type soft frame for fuel gas 13, the soft frame for the manifold of the entrance of oxidant gas 14 and the soft frame for the manifold of the exit of oxidant gas 15 are respectively manufactured, and then they are joined on the bipolar plate substrate 1, as shown in FIG. 4. On the oxidant gas side shown in FIG. 5 also, the one piece type soft frame for oxidant gas 21, the soft frame for the manifold of the entrance of fuel gas 31 and the soft frame for the manifold of the exit of fuel gas 32 are separated similarly. Such separate construction of each soft frame makes it easy to manufacture each soft frame by, for example, a simple drawing or the like.

Figure 9:
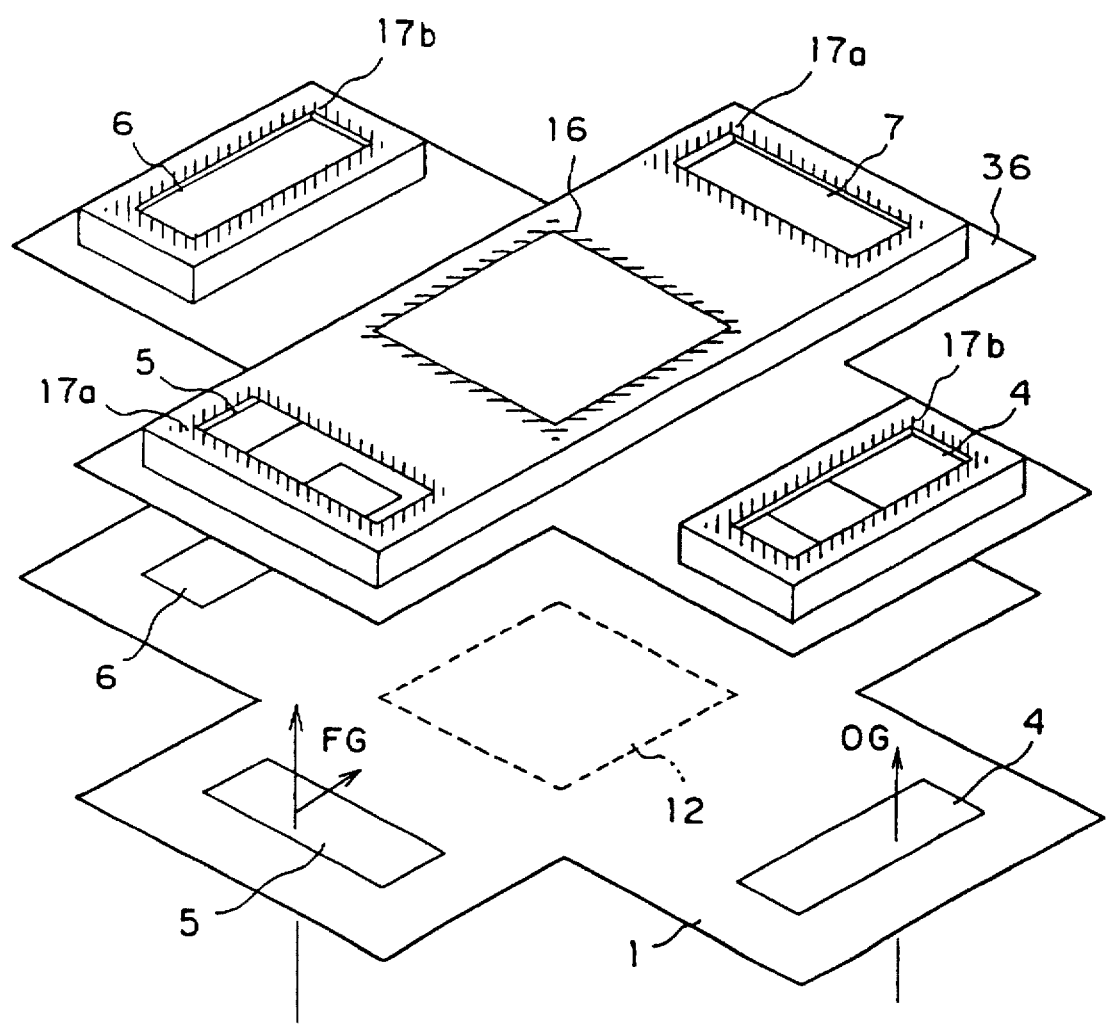
FIG. 9 is an exploded perspective view showing the fuel gas side surface of the bipolar plate of the embodiment 4.

On the other hand, it is possible on the fuel gas side or the oxidant gas side to manufacture a soft frame composing all of the sealing parts in one body from a sheet of plate. This is enabled by, for example, drawing a sheet of thin plate into a prescribed figure. The embodiment of that is shown in FIG. 9. FIG. 9 is an exploded perspective view showing the fuel gas side surface of the bipolar plate for illustrating an all parts of one piece type soft frame for fuel gas 36 being separated from the bipolar plate substrate 1. The all parts of one piece type soft frame for fuel gas 36 unifies the soft frames forming all of the sealing parts composed of the sealing part 16 around the cell reacting area on the fuel gas side, the sealing parts 17a around the manifolds on the fuel gas side and sealing parts 17b around the manifolds on the fuel gas side. The same is possible on the oxidant gas side of the bipolar plate substrate 1.

Consequently, the number of components can be curtailed, and the mounting of the soft frame to the bipolar plate substrate (by joining) can be done at only one time respectively on each side of the fuel side and the oxidant side. Thereby the manufacturing processes can be simplified and the errors of the mounting decrease. Namely, it is possible to manufacture highly accurate members in low cost.

EMBODIMENT 4

The fourth embodiment of the present invention will now be described. The electrolyte matrices 30a and 30b, which are composed of one sheet on the whole surface respectively in the above embodiment 1 as shown in FIG. 6, may be separated respectively at the hollowed part between the one piece type soft frame for fuel gas 13 and the soft frame for the manifold of the entrance of oxidant gas 14 (or the part E in FIG. 6). Such division makes the manufacturing of them easy because there is not necessary to manufacture large sized electrolyte matrices, and improves the quality of them such as the dispersion in thickness and the number of pinholes. In this case, if a mechanism for penetrating electrolyte is installed, namely if a porous substance which electrolyte can penetrate through and which is stable to electrolyte (for example, the same substrate as the electrolyte matrices 30a and 30b, an electrode or the like) or a substance composed of a complex material containing the above porous substance is used as a spacer between the plate type spacer for the hollowed part 19 and the electrolyte matrices 30a and 30b, or as the plate type spacer for the hollowed part 19 itself, then the electrolyte can be distributed in separated parts equally even if a space is produced at the separated parts of the electrolyte matrices 30a and 30b, and thereby the same sealing effect as that of the electrolyte matrices 30a and 30b composed of one sheet respectively can be obtained.

Besides, it may be possible to keep electrolyte in the above hollowed part (or the part E in FIG. 6) for supplying the electrolyte to the sealing parts 17a and 17b around the manifolds and the cell reacting area 12 of the electrolyte matrices 30a and 30b. Consequently, it is possible to keep further more electrolyte and thereby to make the life of the fuel cell long. The electrolyte concretely is initially held in a space in the porous spacer installed in the hollowed part for the flow of electrolyte, the plate type spacer for the hollowed part 19, the corrugated plate type spacer for the hollowed part 23 or the like, or the electrolyte is simply held as a solid electrolyte or powder electrolyte, and it moves to the electrolyte matrices 30a and 30b by the force of capillarity after the heating up of the cell.

EMBODIMENT 5

Figure 10:
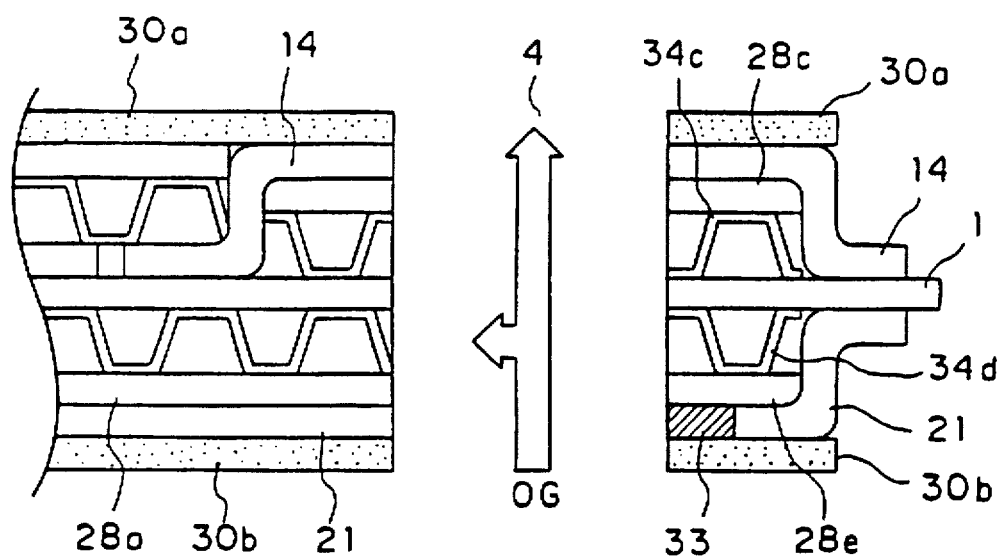
FIG. 10 is a sectional view showing the structure of an electrolyte reservoir installed in the inside of the soft frame for the oxidant gas supplying manifold of the embodiment 5.

The fifth embodiment of the present invention will now be described. The electrolyte which is needed to the electrolyte matrices at the sealing parts around the manifolds is supplied from the electrolyte matrix at the cell reacting area in the above embodiment, but it is also possible to install an electrolyte reservoir adjoining to the sealing parts around the manifolds. An embodiment of it is shown in FIG. 10. FIG. 10 is an enlarged sectional view showing the peripheral area of the oxidant gas supplying manifold 4 shown in FIG. 6. In the present embodiment, electrolyte is held in vacant spaces in, for example, a plate type spacer for oxidant gas 28e installed at the inside of the one piece type soft frame for oxidant gas 21 as the electrolyte reservoir. To be concrete, the type spacer as the electrolyte reservoir may be the same as the cathode electrode on the oxidant gas side for example, and as the anode electrode on the fuel gas side for example. In FIG. 10, reference numeral 33 designates a porous electrolyte transmitting member. The electrolyte transmitting member 33 is composed of, for example, the same material as the electrolyte stored material of the electrolyte matrix, and has a function of a moving path for electrolyte to move from the plate type spacer for oxidant gas 28e to the electrolyte matrix 30b. Because the thickness of the plate member for the soft frames is very thin, for example around 0.2~0.5 mm, and the plate member has wettability to electrolyte, the electrolyte transmitting member 33 is installed for moving electrolyte more surely despite the capability of direct movement of electrolyte from the plate type spacer for oxidant gas 28e to the electrolyte matrix 30b along the surface of the soft frame.

In the soft seal of a manifold, it is generally possible to hold electrolyte in a space in a porous material (for example an electrode) or a corrugated plate type spacer. The stored electrolyte melts at the point of time when temperature reaches to the melting point of electrolyte at the time of heating up of the cell, then the molten electrolyte is absorbed by the electrolyte matrix 30 by the force of capillarity.

The present embodiment has the advantage that the supplement of electrolyte, namely the attainment of wet sealing (or the attainment of gas sealing), can be performed quickly especially at the time of the heating up of the fuel cell, since the supplement of electrolyte to the electrolyte matrix 30b at the gas sealing part of the manifolds is done from the adjoining electrolyte reservoir 28e. It is important from the view point of safety especially at the time of introducing fuel gas into the fuel gas system of a large fuel cell at the initial time of its operation. At a high temperature at which electrolyte melts (for example 450°~500° C.) it is desirable from the view point of the protection of materials to supply reducing fuel gas to the fuel gas channel as soon as possible for the sake of preventing the oxidization of members. In the embodiment shown in FIG. 4, since the permeation length of electrolyte is long especially at the region opposite to the cell reacting area in the electrolyte matrix 30b at the gas sealing parts of the manifolds, the present embodiment is effective. Besides, the present electrolyte reservoir 28e can supplement electrolyte which grows to be lack in the electrolyte matrix 30b as the passage of time. It is attained by adjusting the force of capillarity, for example by adjusting the diameters of fine holes, of the electrolyte in the electrolyte reservoir 28e and the electrolyte matrix 30b.

Besides, in the case where the supplement of electrolyte is done only the permeation from the electrolyte matrix at the cell reacting area, it is required to hold excessive electrolyte in the electrode at the cell reacting area to wet the electrode excessively by the electrolyte, and thereby the performance of cell is easily damaged. Moreover, there is also a fault that the life of the cell is shortened due to the limitation of the amount of electrolyte to be reserved. According to the present embodiment, it is possible to store enough electrolyte, which is necessary for the electrolyte matrix at the gas sealing parts of the manifolds, in the electrolyte reservoir installed at the inside of the soft frame, thereby the embodiment can get over the above problems without providing another new or complex space or construction.

EMBODIMENT 6

In the above embodiment, the description was done about the case where the same electrolyte holding material as that used in the electrolyte matrices 30a and 30b at the cell reacting area was used as the porous gasket material to compose the sealing part around the manifolds. In the case where the porous gasket material is composed of the same material as the electrolyte holding material as mentioned above, the material is very stable to the electrolyte. And, since the materials inserted between the two bipolar plates are the same at all of the cell reacting area and the sealing parts, the mechanical performances of the electrolyte matrices and the porous gasket material are the same, which eliminates the shrinkage on one side or the like, and thereby the sealing performance uniform on all surfaces can be obtained. But, the porous gasket material is not restricted to the above mentioned material, materials whose primary ingredient is chemical compounds such as alumina, silica, zirconia, talc, mica or the like are usable without no troubles.

EMBODIMENT 7

The seventh embodiment of the present invention will now be described. The description about the fuel cell employing wet sealing using electrolyte as the gasket at the gas sealing parts of the manifolds was done in the above embodiment 6. In the construction of the bipolar plate shown in FIG. 4, the sealing part around the cell reacting area 12 and the sealing parts around the manifolds are separated by the hollowed parts, accordingly it is possible to provide the gaskets at the sealing parts around the manifolds independently. In that case, there can be solved the problems such as the corrosion of the metal materials at the soft frames supporting the gaskets due to electrolyte and the loss of gas sealing ability due to the lack of the electrolyte forming the wet seals of the gaskets by utilizing the gaskets which do not contain electrolyte as the gaskets. It is generally known that the electrolyte held in the electrolyte matrices moves to the positive side of the electric potential in the direction of the lamination of the cell by the operation of electrochemical reaction, and consequently the lack of electrolyte, namely the decreasing of the wet sealing ability, is often caused in the electrolyte matrices (or the gaskets) on the negative side of the electric potential. The electric matrix containing no electrolyte has not such a problem.

Since in the construction of the bipolar plate according to the present embodiment the sealing part around the cell reacting area and the sealing parts around the manifolds are structurally separated, it is also possible to utilize the materials which react with electrolyte as the gasket materials at the gas sealing parts around the manifolds by suitably designing. To be concrete, the attachment of electrolyte to the gasket material at the sealing part around the manifolds can be suppressed to the degree capable of substantially neglecting the attachment by keeping the distance between the sealing part around the cell reacting area and the sealing parts around the manifolds appropriately (for example, about 3~5 cm or more). As the result, popular inorganic gasket materials, for example materials containing silica, alumina, talc or the like as principal ingredient, which have not been used due to their reactivity with electrolyte conventionally, can also be utilized as the gasket materials at the gas sealing part around the manifolds.

Besides, it is also possible to realize the wet sealing of the gasket by using the materials which is liquid at the operation temperature of the cell other than electrolyte (for example glass boride, boron oxide or the like). In this case, the space in the gasket is filled by the liquid, and consequently the better ability of gas sealing can be obtained.

EMBODIMENT 8

Figure 2:
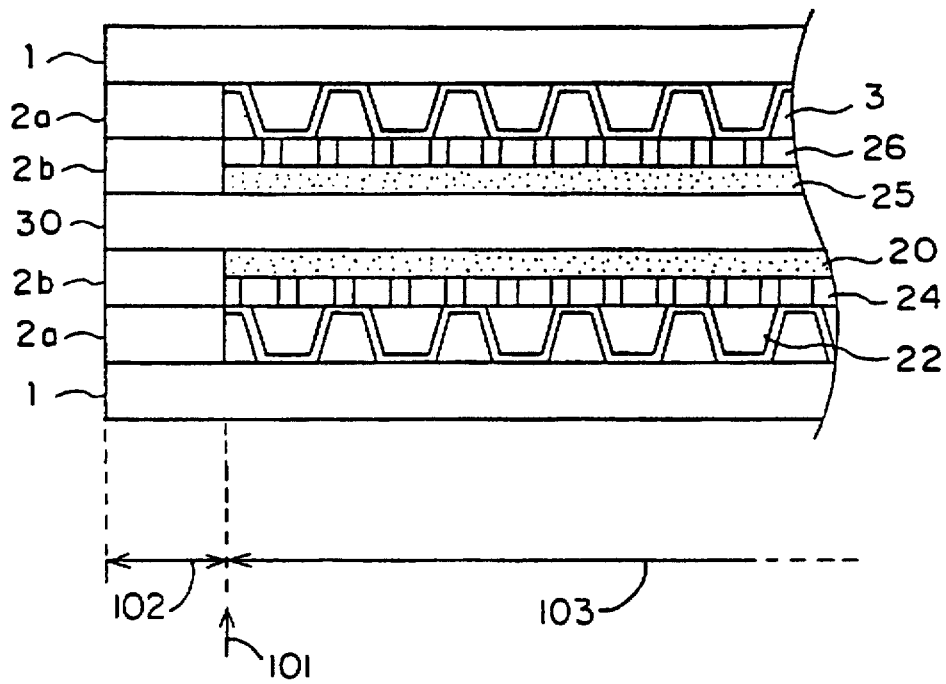
FIG. 2 is an enlarged sectional view showing a cross section A—A of the bipolar plate in the state of fuel cell assembling which illustrated in FIG. 1.
Figure 3:
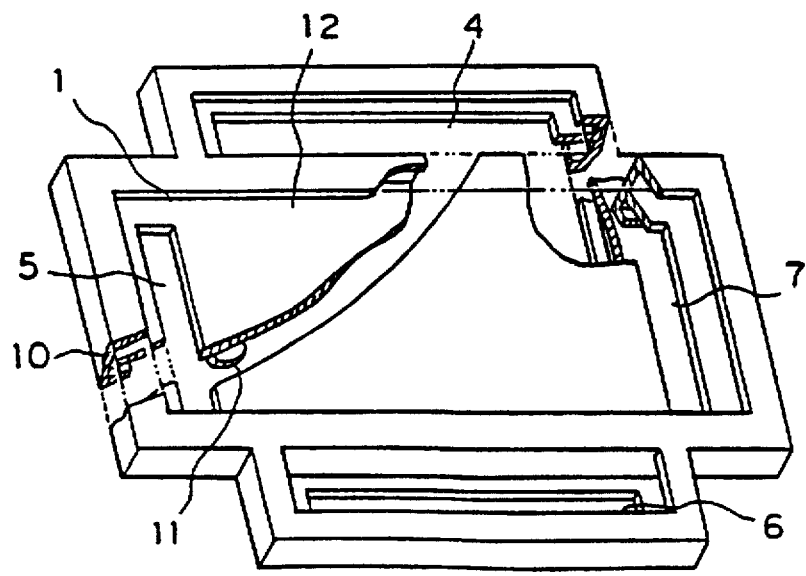
FIG. 3 is a perspective view of another conventional bipolar plate.
Figure 11:
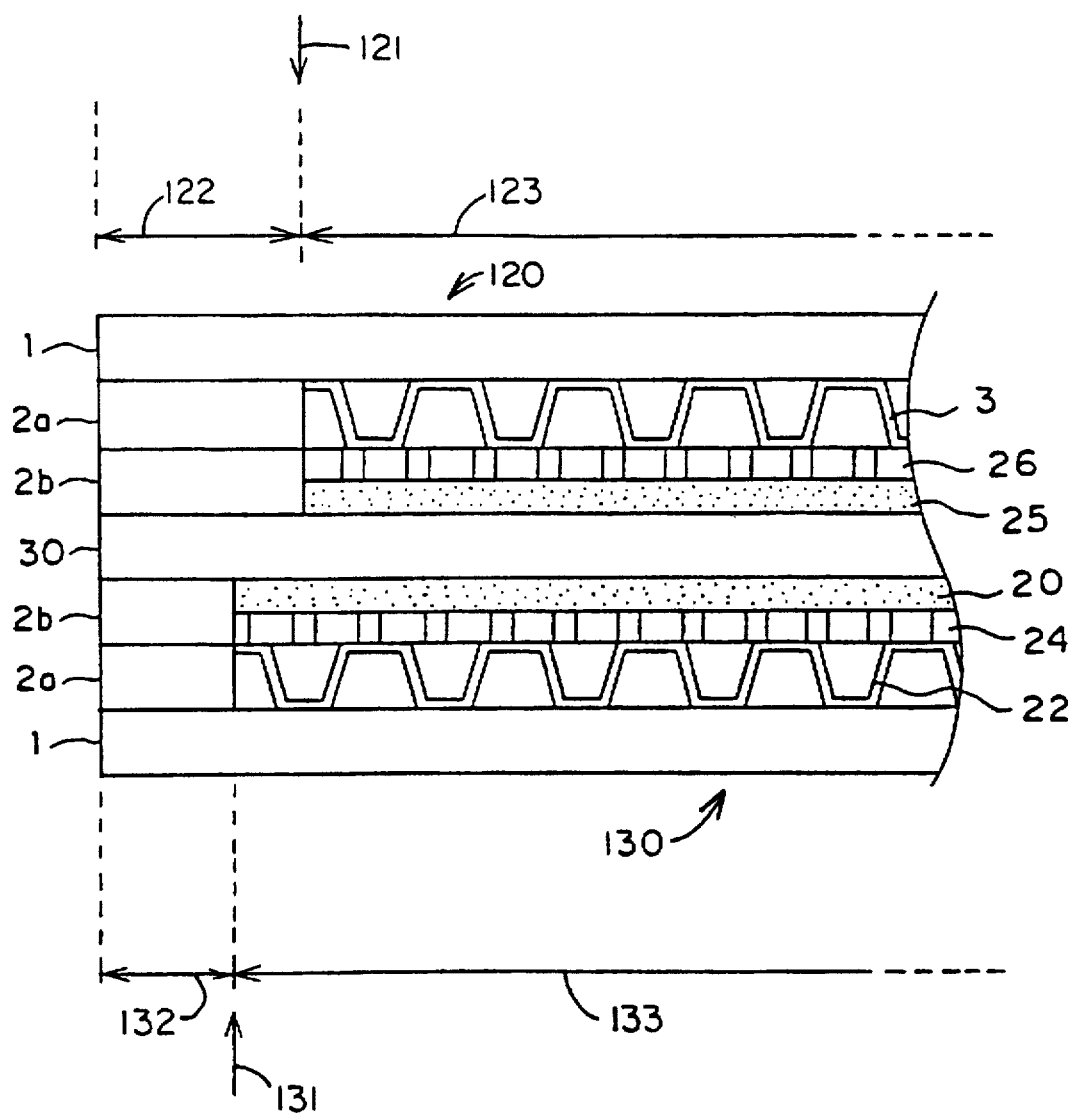
FIG. 11 is a sectional view showing the structure of the gas sealing part adjoining the electrode planes in the cell reacting area according to the embodiment 8.

The eighth embodiment of the present invention will now be described. FIG. 6 concerning the above embodiment 1 illustrates the embodiment in which the boundary lines between the gas sealing parts and the cell reacting areas are the same positions on both the fuel gas side and the oxidant gas side through the electrolyte matrices at the gas sealing parts adjoining to the electrode surfaces in the cell reacting area. Such a construction is also employed by the prior art shown in FIG. 2, and such a construction is popular. FIG. 11 shows the present embodiment of the invention compared to the prior art shown in FIG. 2 at the same part. As shown in FIG. 11, the positions of the boundary lines are different on the anode side and the cathode side through the electrolyte matrix, which enables the great improvement of the reliability of the gas sealing of the electrolyte matrix.

That is to say, the boundary lines between the gas sealing part and the cell reacting area are set at the different positions to each other on the fuel gas side and the oxidant gas side through the electrolyte matrix at the gas sealing part adjoining to the electrode. Consequently, each one side surface supporting the electrolyte matrix 30 is always a flat plane having no difference in level on each boundary line, which greatly decreases the occurrences of cracks of the electrolyte matrix 30 due to the difference in level between the gas sealing part and the cell reacting area. Like this embodiment, in case of the internal manifold, sufficient gas sealing performance can be obtained by wet sealing of electrolyte matrix having no cracks, and a manifold which has the very little amount of leakage of gas can be formed.

Besides, in the above embodiment, the above boundary lines are shifted from each other by enlarging the width of the gas sealing part on the side of fuel gas. Since the fuel gas, especially hydrogen, has the high risk of gas leakage owing to its small molecular size, and is much dangerous in case of leakage, and further highly badly influential to the cell characteristics, enlarging the width of gas sealing on the fuel gas side has the advantage of the improvement of the gas sealing for oxidant gas also.

Consequently, the present embodiment can attain the stable gas sealing ability in all operation conditions of a fuel cell including thermal cycles in which cracks is particularly easy to occur. Besides, cheap members which have loose tolerances can be available, and thereby cheap fuel cell can be obtained.

EMBODIMENT 9

The ninth embodiment of the present invention will now be described. In the above embodiment, the internal manifold type was described. The external manifold type in which manifolds are attached on the side surface of a cell stack has the same effects as those of the internal manifold type. To be concrete, for example, the cell stack having the flow structure of the parallel flow, in which the supply of fuel gas and oxidant gas is done from the same direction, or the flow structure of the opposite flow, in which fuel gas and oxidant gas are supplied from the opposite sides respectively, can obtain the same effect.

Figure 12:
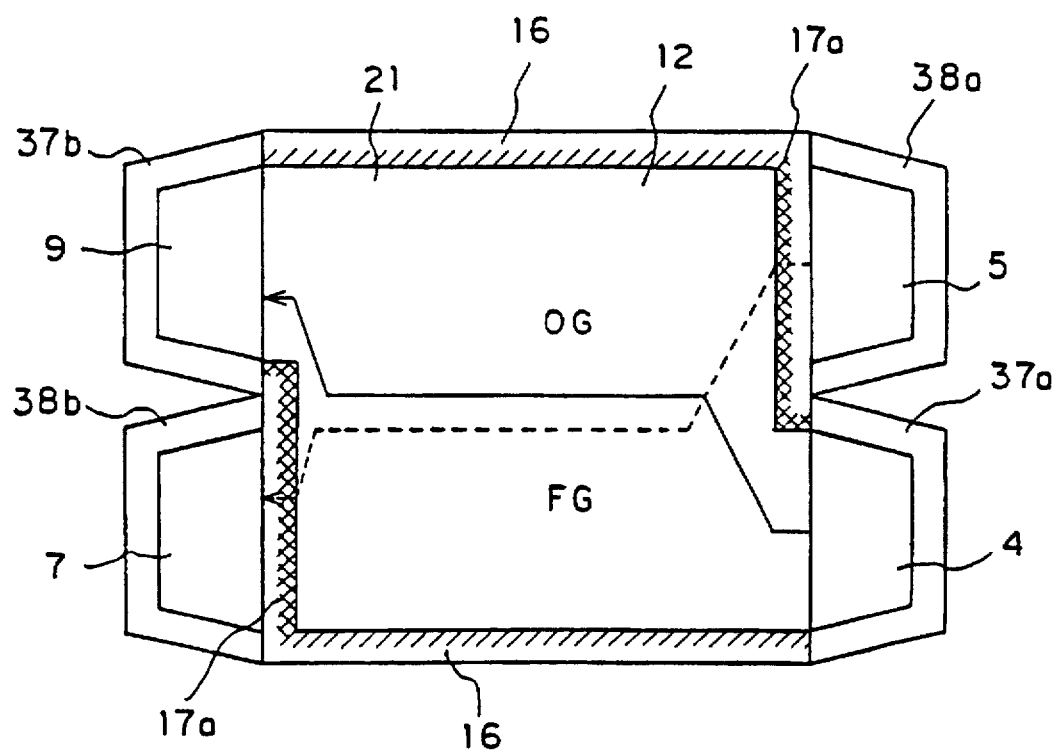
FIG. 12 is a plan view of the parallel flowing type bipolar plate of the external manifold system according to the embodiment 9 of the present invention.

FIG. 12 shows the oxidant gas side of a bipolar plate of the parallel flow system. In the figure, reference numerals 37a, 37b, 38a and 38b designate the external manifolds for oxidant gas and fuel gas respectively. The oblique lines drawn parts designate places to be sealed. The oblique lines drawn parts comprise the sealing parts 16 around the cell reacting area which sealing parts 16 seal the cell reacting area 12 from the outside air, and the sealing parts 17a and 17b around the manifolds (the sealing part 17b is not shown) which sealing parts 17a and 17b seal the cell reacting area 12 from each manifold 4, 5, 6 and 7. On the fuel gas side of the bipolar plate, the sealing parts 17b around the manifolds are installed at the parts where the oxidant gas supplying manifold 4 and the oxidant gas exhausting manifold 6 on the oxidant gas side adjoin the cell reacting area 12 for separating those manifolds 4, 6 from the oxidant gas channels on the cell reacting plane. The arrow in FIG. 12 shows the flow of gas. The oxidant gas is supplied from the oxidant gas supplying manifold 4, passes through the cell reacting area 12, and is lead to the oxidant gas exhausting manifold 6. The fuel gas is supplied from the fuel gas supplying manifold 5 at the same direction as that of the oxidant gas supplying manifold 4, passes through the opposite side cell reacting area 12 in regard to the electrolyte matrices, and is lead to the fuel gas exhausting manifold. On the contrary, in case of the opposite flow system, the fuel gas is supplied from the contrary direction to the arrow.

Since, in the embodiment shown in FIG. 12, the sealing part 16 around the cell reacting area on the fuel gas side and the sealing part 16 around the cell reacting area on the oxidant gas side, which sealing parts 16 do not adjoin the manifolds 4, 5, 6 and 7 among all of the sealing areas, are position at the same positions in regard to the electrolyte matrix, and consequently, the gas sealing having high reliability can be obtained by shifting the boundary lines between the sealing parts and each electrode to each other like the embodiment 8.

EMBODIMENT 10

Figure 13:
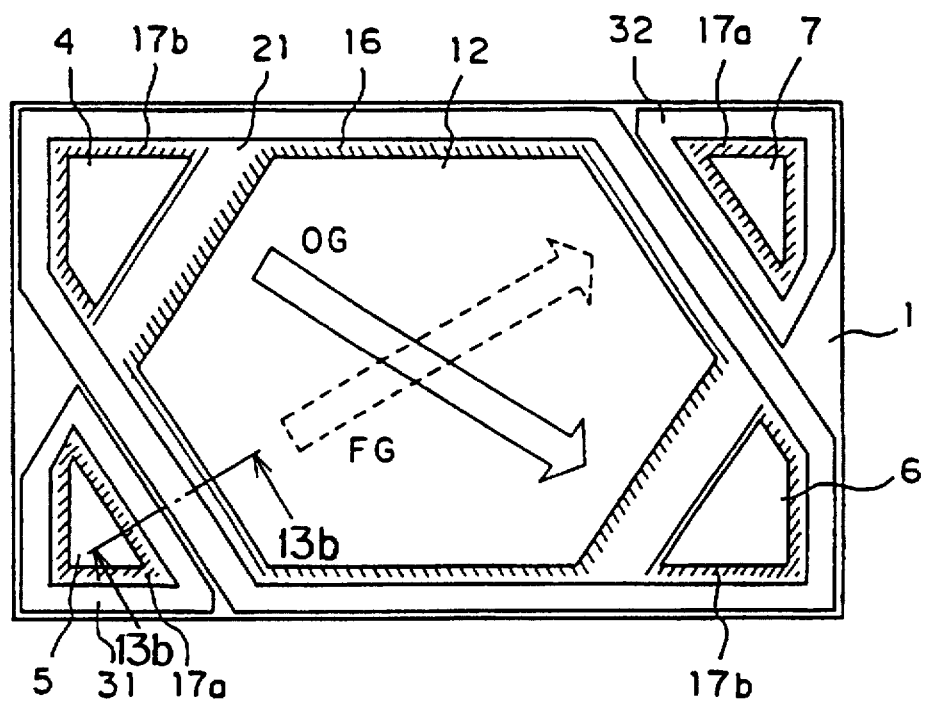
FIG. 13(a) is a plan view of the parallel flowing type or the opposite flowing type bipolar plate of the embodiment 10 of the present invention.
FIG. 13(b) is a sectional view taken along the B—B line in FIG. 13(a).
Figure 13:
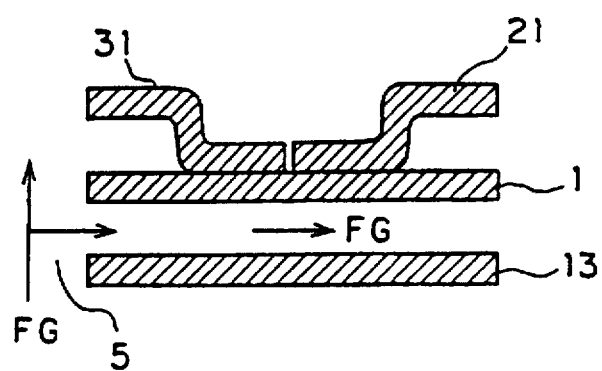

The tenth embodiment of the present invention will now be described. FIG. 4 of the above embodiment 1 illustrates the fuel cell in which the oxidant gas and the fuel gas flow as a cross flow in the electrode planes with the electrolyte matrix between, but a parallel flow type which supply the fuel gas and the oxidant gas from the same direction and a counter flow type which supply them from the opposite side respectively can get the same effect. FIG. 13(a) shows the bipolar plate of the parallel flow type fuel cell stack from the oxidant gas side, and FIG. 13(b) is a sectional view taken along the B—B line of FIG. 13(a). On the oxidant gas side, the one piece type soft frame for oxidant gas 21, the soft frame for the manifold of the entrance of fuel gas 31 and the soft frame for the manifold of the exit of fuel gas 32 are joined on the bipolar plate substrate 1. The oblique lines drawn parts designate the parts to be sealed, and the arrows designate gas flows. The oxidant gas is supplied from the oxidant gas supplying manifold 4, passes through the cell reacting area 12, and is lead to the oxidant gas exhausting manifold 6.

In the gas sealing regions, as shown in FIG. 13(b), the one piece type soft frame for oxidant gas 21 and the soft frame for the manifold of the entrance of fuel gas 31 are joined on the bipolar plate substrate 1 above the bipolar plate substrate 1, and the one piece type soft frame for fuel gas 13 is joined on the bipolar plate substrate 1 below the bipolar plate substrate 1. The left side of FIG. 13(b) shows the fuel gas supplying manifold 5. The fuel gas is supplied from the fuel gas supplying manifold 5, passes through the space between the bipolar plate substrate 1 and the one piece type soft frame for fuel gas 13, and is lead to the cell reacting area 12 (or the region on the right side of the same figure).

In the case where the flow directions of the oxidant gas and the fuel gas are counter or parallel, the temperature distribution in the cell surfaces is one-dimensional along the gas flow direction, and thereby the advantage that the thermal control of the cell stack is easier than that of the cross flow type.

Besides, the gas sealing around the electrode part and the gas sealing around the manifolds on one sheet of the electrolyte matrix in the above counter flow type or the parallel flow type (shown in FIG. 13(a) and FIG. 13(b)) bring about an advantage that a cheap and compact fuel cell can be obtained owing to few useless electrolyte matrices in comparison with the cross flow type (shown in FIG. 4).

It will be appreciated from the foregoing description that, according to the first aspect of the present invention, since the bipolar plate is designed to provide the gas seal around the electrode and the gas seal around the fuel gas manifold on the same plane and to separate the gas seal around the electrode and the gas seal around the oxidant gas manifold with a hollowed part on the anode electrode side, and to provide the gas seal around the electrode and the gas seal around the oxidant gas manifold on the same plane and to separate the gas seal around the electrode and the gas seal around the fuel gas manifold with a hollowed part on the cathode electrode side, the fuel gas and the oxidant gas is surely separated by the hollowed part, then the molten carbonate fuel cell of an internal manifold type has the ability of gas sealing stable for a long term.

Furthermore, according to the second aspect of the present invention, since the space of the hollowed part is opened to the outside atmosphere gas, the material forming the hollowed part has no parts where fuel gas and oxidant gas contact at the same time on its top and bottom surfaces, and thereby the generation of local cells can be suppressed even if the material forming the hollowed part is wetted by electrolyte.

Furthermore, according to the third aspect of the present invention, since the electrolyte matrix is used by being divided into an electrode part matrix opposed to the electrode and the gas seal around the electrode and a manifold part matrix opposed to the gas seal around the manifold at the hollowed part, there is no need to product a large sized electrolyte matrix, and thereby its manufacturing becomes easy and the qualities of the electrolyte matrix such as the dispersion in thickness and the number of pin holes can be improved.

Furthermore, according to the fourth aspect of the present invention, the molten carbonate fuel cell of an internal manifold type is constructed to comprise an electrolyte flowing mechanism in the hollowed part in order that the electrolyte held in the electrode part matrix and the electrolyte held in the manifold part matrix can flow between both the matrix parts mutually, and consequently, the electrolyte is equally distributed to both the matrices and thereby the same sealing effect as that of the electrolyte matrix composed of one sheet can be obtained.

Furthermore, according to the fifth aspect of the present invention, the molten carbonate fuel cell of an internal manifold type is constructed to comprise a spacer in the hollowed part in order that surface pressure may be impressed on the hollowed part through the spacer in the stacking direction, and consequently, very fragile electrolyte matrices can be supported by the spacer and thereby the damage of the electrolyte matrices can be prevented.

Furthermore, according to the sixth aspect of the present invention, the spacer is at least one of an electrolyte matrix, a cathode electrode, a porous plate and a corrugated plate, and consequently, the sufficient amount of oxygen can be supplied to the electrolyte matrices through the opened parts of the spacer at the time of the burnout of binders, thereby sufficient burnout can be executed. As the result, the electrolyte matrices supported by the spacer have functions of good affinity with electrolyte and the well penetration of electrolyte, then the electrolyte matrices have sufficient functions as the moving paths of electrolyte.

Furthermore, according to the seventh aspect of the present invention, the molten carbonate fuel cell of an internal manifold type is constructed to comprise electrolyte in the space of the hollowed part so as to supply the electrolyte to the electrolyte matrix, and consequently, it becomes possible to hold further more electrolyte, and thereby it becomes possible to elongate the life of the fuel cell.

Furthermore, according to the eighth aspect of the present invention, since the bipolar plate is composed by joining one piece type soft frames on both surfaces of a flat plate-like bipolar plate substrate for separating fuel gas and oxidant gas in the stacking direction at a part opposed to the electrode, each of the one piece type soft frames being composed of one body installing all the gas seals around the electrode and around the manifolds for supplying or exhausting fuel gas or oxidant gas on it, the number of components and the man-hour of assembly can be decreased, and further positioning accuracy is improved at the time of joining the soft frames.

Furthermore, according to the ninth aspect of the invention, since the bipolar plate comprises: a flat plate-like bipolar plate substrate for separating fuel gas and oxidant gas in the stacking direction at a part opposed to the electrode; a frame-like one piece type soft frame for fuel gas composed of one body installing the gas seal around the electrode and the gas seal around the fuel gas manifold on it and a first frame-like soft frame for a manifold installing the gas seal around the oxidant gas manifold, the frame-like one piece type soft frame for fuel gas and the first frame-like soft frame for a manifold being respectively joined on the anode electrode side of the bipolar plate substrate; and a frame-like one piece type soft frame for oxidant gas composed of one body installing the gas seal around the electrode and the gas seal around the oxidant gas manifold on it and a second frame-like soft frame for a manifold installing the gas seal around the fuel gas manifold, the frame-like one piece type soft frame for oxidant gas and the second frame-like soft frame for a manifold being respectively joined on the cathode electrode side of the bipolar plate substrate; each soft frame can easily be manufactured by, for example, simply drawing and likely.

Furthermore, according to the tenth aspect of the present invention, since the following steps are executed in order: obtaining a prescribed shaped soft frame by drawing a flat plate; obtaining a corrosion protection layer to electrolyte by coating aluminum at least at a gas seal around an electrode of the soft frame; and joining the soft frame on a bipolar plate substrate; bipolar plates having corrosion protection layers at parts exposed to electrolyte can easily be obtained.

Furthermore, according to the eleventh aspect of the present invention, since the fuel cell comprises plural cells laminated on each other through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; wherein the bipolar plate comprises: a flat plate-like bipolar plate substrate for separating fuel gas and oxidant gas in the stacking direction at a part opposed to the electrodes; and sealing frames joined on both sides of the bipolar plate substrate and forming at least gas seals around the electrodes, the sealing frames being joined by plural joining lines respectively at the parts contacting on the surfaces of the bipolar plate substrates; the sealing frames can surely be joined, and thereby the gas leakage from the joining parts due to defective joining, corrosion and the like can be suppressed.

Furthermore, according to the twelfth aspect of the present invention, since the plural joining lines cross each other, the sealing frames can more surely be joined, and thereby the gas leakage from the joining parts due to defective joining, corrosion and the like can be suppressed.

Furthermore, according to the thirteenth aspect of the present invention, the bipolar plate comprises: a flat plate-like bipolar plate substrate for separating fuel gas and oxidant gas in the stacking direction at a part opposed to the electrodes, and sealing frames joined on both sides of the bipolar plate substrate and forming at least gas seals around the electrodes; the above bipolar plate substrate has a corrosion protection layer on the surface at a region exposed to fuel gas atmosphere; the joining of the sealing frames at the corrosion protection layer on the bipolar plate substrate is performed at the parts where the sealing frames contact on the surface of the corrosion protection layer; and the penetration of joining material into the parts pierces through the corrosion protection layer; and consequently, the sealing frames can surely be joined, and thereby the gas leakage from the joining parts due to defective joining, corrosion and the like can be suppressed.

Furthermore, according to the fourteenth aspect of the present invention, the fuel cell comprises: a stack composed by laminating plural cells through a bipolar plate, each of the cells putting an electrolyte matrix between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; a fuel side gas sealing part adjoining anode electrode parts; and an oxidant side gas sealing part opposed to the fuel side gas sealing part in regard to the electrolyte matrix and adjoining the cathode electrode; wherein the positions of each boundary line between each of the gas sealing parts and each electrode adjoining the gas sealing part of each side is different to each other in regard to the plane of the electrolyte matrix; and consequently, each one side surface supporting the electrolyte matrix is always a flat plane having no difference in level on each boundary line, then the occurrences of cracks of the electrolyte matrices due to the difference in level between the gas sealing part and the cell reacting area are greatly decreased, and thereby stable cell performances can be obtained.

Furthermore, according to the fifteenth aspect of the present invention, since each of the fuel gas supplying or exhausting manifold and the oxidant gas supplying or exhausting manifold is an internal manifold composed of a hole opened to an adjoining cell in the stack, sufficient gas sealing performance can be obtained by the wet sealing of electrolyte matrices having no cracks, and thereby the manifolds which have the very little amount of leakage of gas can be formed.

Furthermore, according to the sixteenth aspect of the present invention, since the width of the fuel side gas sealing part is wider than the width of the oxidant side gas sealing part opposed to the fuel side gas sealing part in regard to the electrolyte matrix, the sealing of fuel gas which is more dangerous and more decreases cell performances in case of leakage becomes surer.

Furthermore, according to the seventeenth aspect of the present invention, the molten carbonate fuel cell of an internal manifold type comprises: a stack composed by laminating plural cells through a bipolar plate, each of the cells putting an electrolyte matrix of electrolyte stored in its electrolyte storing member between an anode electrode and a cathode electrode and generating by flowing fuel gas and oxidant gas through a fuel gas channel opposed to the anode electrode and an oxidant gas channel opposed to the cathode electrode respectively; a fuel gas supplying or exhausting manifold and an oxidant gas supplying or exhausting manifold for supplying or exhausting fuel gas or oxidant gas to the fuel gas channel or the oxidant gas channel respectively, each of the manifolds being composed of a hole opened to an adjoining cell in the stack; and soft frames arranged on both sides of the bipolar plate separating fuel gas and oxidant gas in the stacking direction at a part opposed to the electrodes, the soft frames forming gas sealing parts around the electrodes and the manifolds; wherein each of the gas sealing parts around the manifolds comprises a porous gasket material and electrolyte held in the inside of the soft frames and changing into liquid state at the operation temperature of the fuel cell to be held in a vacant space in the inside of the porous gasket material; and consequently, the gas sealing ability of the manifolds can rapidly be established at the time of heating up of the fuel cell, and the sufficient amount of electrolyte which is needed by the electrolyte matrices at the gas sealing parts can be held in the soft frames, thereby the sufficient ability of gas sealing can be obtained without providing another new or complex space or construction. Furthermore, since the same electrolyte is used at the sealing parts around the manifolds and cell parts, there happens no loss due to the reactions of both the electrolyte.

Furthermore, according to the eighteenth aspect of the present invention, since the porous gasket material is the same material as that of the electrolyte stored member, the porous gasket material is extremely stable to electrolyte owing to the sameness of material. Also, since the materials put between two bipolar plates are all the same at the cell reacting areas and gas sealing parts, the mechanical properties of the electrolyte matrices and the porous gasket materials, and thereby no one-sided shrinkage and the like happen. Consequently, the sealing performances equal on all surfaces can be obtained.

Furthermore, according to the nineteenth aspect of the present invention, since the electrolyte matrix is arranged to be opposed to the electrodes and the gas seals supplied around the electrodes, and each of the gas seals around the manifolds is a manifold gasket material not containing electrolyte, the manifold gasket material being arranged opposingly, it is possible to attain the sealing performance of the gas seals around the manifolds without using the wet sealing by means of electrolyte. Consequently, there happen no such problems as the corrosion due to electrolyte, the decreasing of the gas sealing performance due to the lack of electrolyte caused by the migration of the electrolyte, and thereby the gas sealing performance stable for a long term can be obtained.

Furthermore, according to the twentieth aspect of the present invention, since the manifold gasket material comprises a porous gasket material and a wet sealing material changing into a liquid state at the operation temperature of the fuel cell to be held in a vacant space in the inside of the porous gasket material, the vacant space in the gasket is filled up by liquid, and thereby a good gas sealing performance can be obtained. Besides, the fuel cell described in the first aspect is designed to separate the gas seals around the cell reacting areas and the gas seals around the manifolds, accordingly the materials for wet sealing different from the electrolyte stored in the electrolyte matrices can be used for resolving the problem of corrosion owing to the electrolyte at these parts.

What is claimed is:

1. In a fuel cell comprising:
 a stack composed by laminating plural cells through a bipolar plate, each of said cells putting an electrolyte matrix between an anode electrode and a cathode electrode and generating energy by flowing fuel gas and oxidant gas through a fuel gas channel opposed to said anode electrode and an oxidant gas channel opposed to said cathode electrode respectively;
 a fuel gas supplying or exhausting manifold and an oxidant gas supplying or exhausting manifold for supplying or exhausting fuel gas or oxidant gas to said fuel gas channel or said oxidant gas channel respectively, each of said manifolds being composed of a hole opened to an adjoining cell in said stack;
 a fuel side gas sealing part abutting a first side of said electrolyte matrix and adjoining said anode electrode at a first boundary line; and
 an oxidant side gas sealing part abutting a second side of said electrolyte matrix opposite said first side of said electrolyte matrix and adjoining said cathode electrode at a second boundary line said first and second boundary lines being parallel to one another;
 wherein positions of said first and second boundary lines are offset from each other with respect to a plane defined by said electrolyte matrix.

2. The fuel cell according to claim 1 wherein each of said fuel gas supplying or exhausting manifold and said oxidant gas supplying or exhausting manifold is an internal manifold composed of a hole opened to an adjoining cell in said stack.

3. The fuel cell according to claim 1 wherein the width of said fuel side gas sealing part is wider than the width of said oxidant side gas sealing part.

* * * * *